(12) United States Patent
Harada et al.

(10) Patent No.: US 10,466,405 B2
(45) Date of Patent: Nov. 5, 2019

(54) PRISM SHEET FOR BACKLIGHT UNIT AND BACKLIGHT UNIT FOR LIQUID CRYSTAL DISPLAY DEVICE

(71) Applicant: KEIWA INC., Tokyo (JP)

(72) Inventors: Kenichi Harada, Tokyo (JP); Yoshitada Namikawa, Tokyo (JP); Tadayoshi Fukuda, Tokyo (JP); Yuki Matsuno, Tokyo (JP)

(73) Assignee: Keiwa Inc., Tokyo (JP)

(*) Notice: Subject to any disclaimer, the term of this patent is extended or adjusted under 35 U.S.C. 154(b) by 0 days.

(21) Appl. No.: 15/622,550

(22) Filed: Jun. 14, 2017

(65) Prior Publication Data

US 2017/0357047 A1 Dec. 14, 2017

(30) Foreign Application Priority Data

Jun. 14, 2016 (JP) .................................. 2016-118261
May 15, 2017 (JP) .................................. 2017-096292

(51) Int. Cl.
*F21V 8/00* (2006.01)

(52) U.S. Cl.
CPC .......... *G02B 6/0053* (2013.01); *G02B 6/0051* (2013.01)

(58) Field of Classification Search
CPC .... G02B 6/0053; G02B 6/005; G02B 6/0051; G02B 5/18; G02F 1/133615
USPC ....................................................... 362/606
See application file for complete search history.

(56) References Cited

U.S. PATENT DOCUMENTS

| | | | | |
|---|---|---|---|---|
| 2004/0109244 A1* | 6/2004 | Kokogawa | ........... | G02B 5/1866 359/831 |
| 2008/0013015 A1* | 1/2008 | Joo | ....................... | G02B 6/0036 349/65 |
| 2014/0286044 A1* | 9/2014 | Johnson | ................. | G02B 5/021 362/607 |

FOREIGN PATENT DOCUMENTS

| | | |
|---|---|---|
| CN | 105190369 A | 12/2015 |
| JP | 2001-143515 A | 5/2001 |
| JP | 2007-148081 A | 6/2007 |
| KR | 10-2004-0048803 A | 6/2004 |
| KR | 10-2008-0005697 A | 1/2008 |
| KR | 10-2015-0134389 A | 12/2015 |

* cited by examiner

*Primary Examiner* — Anh T Mai
*Assistant Examiner* — Jessica M Apenteng
(74) *Attorney, Agent, or Firm* — Norris McLaughlin, P.A.

(57) ABSTRACT

Provided is a prism sheet for a backlight unit capable of attaining desired luminance in the front direction, and securing a sufficient viewing angle in the direction perpendicular to the orientation direction of the prism array. The prism sheet comprises one or more resin layers, an outermost resin layer of the one or more resin layers comprising a prism array, wherein on a surface of at least one of the one or more resin layers, micro linear grooves are formed to be parallel to, or to intersect at an acute angle with, an orientation direction of the prism array. An average number of existing micro linear grooves per unit length in a direction perpendicular to an average orientation direction of the micro linear grooves is preferably no less than 30/mm and no greater than 10,000/mm. The micro linear grooves are preferably irregular in length, width or pitch.

7 Claims, 13 Drawing Sheets

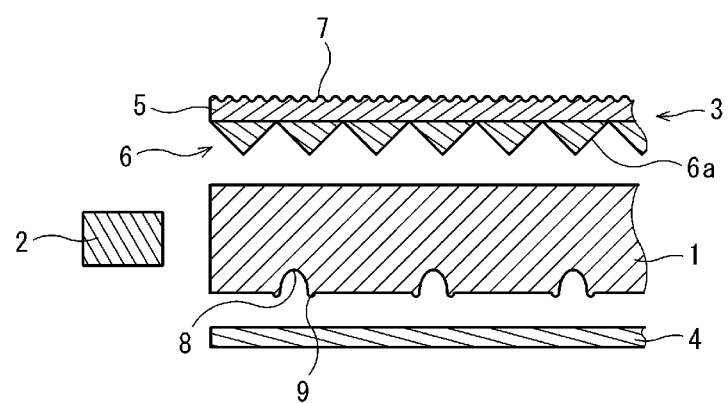
F I G. 2

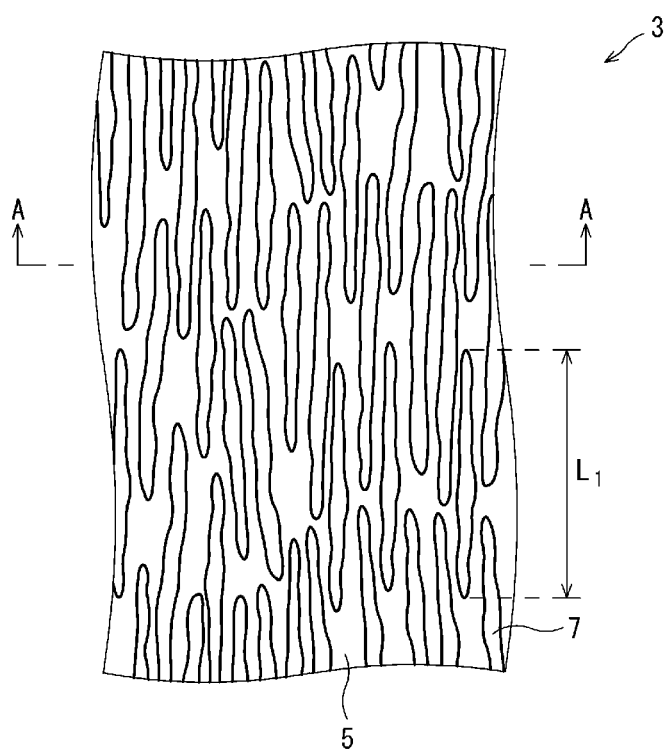
F I G. 3

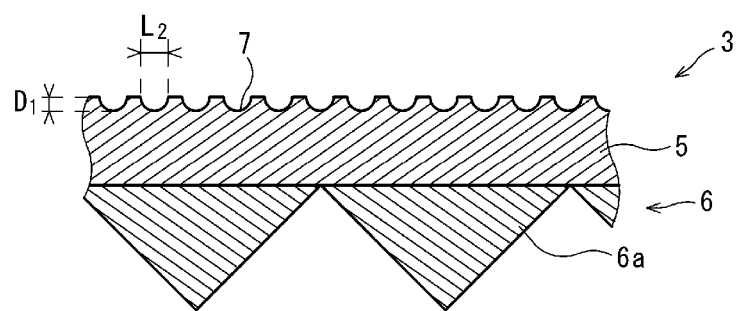
F I G. 4

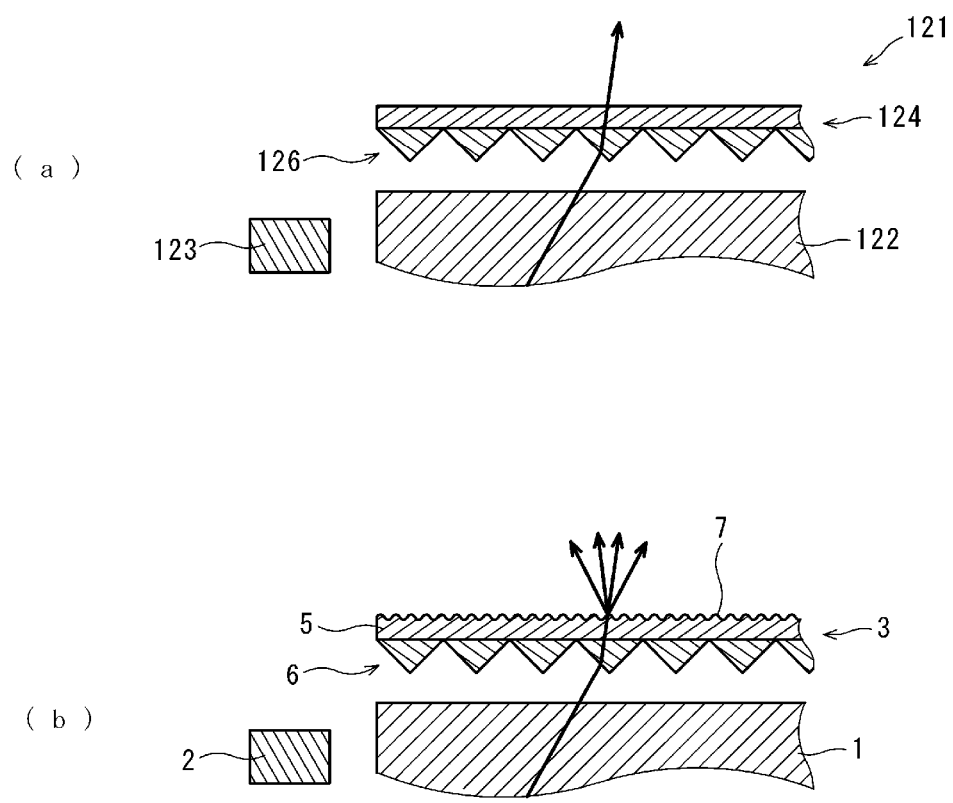
F I G. 5

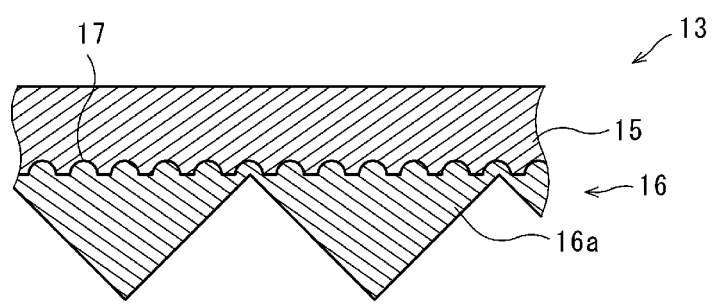
F I G. 6

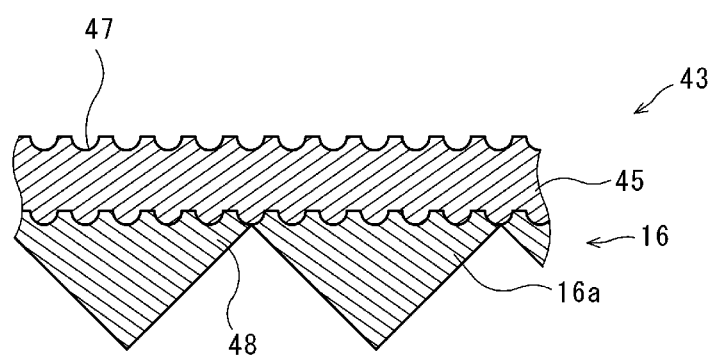
F I G. 9

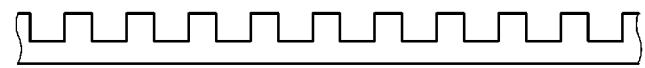
F I G. 10

F I G. 11

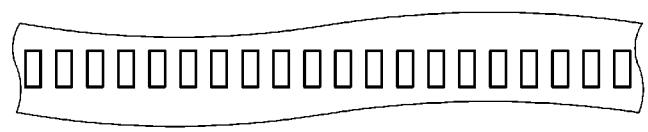
F I G. 12

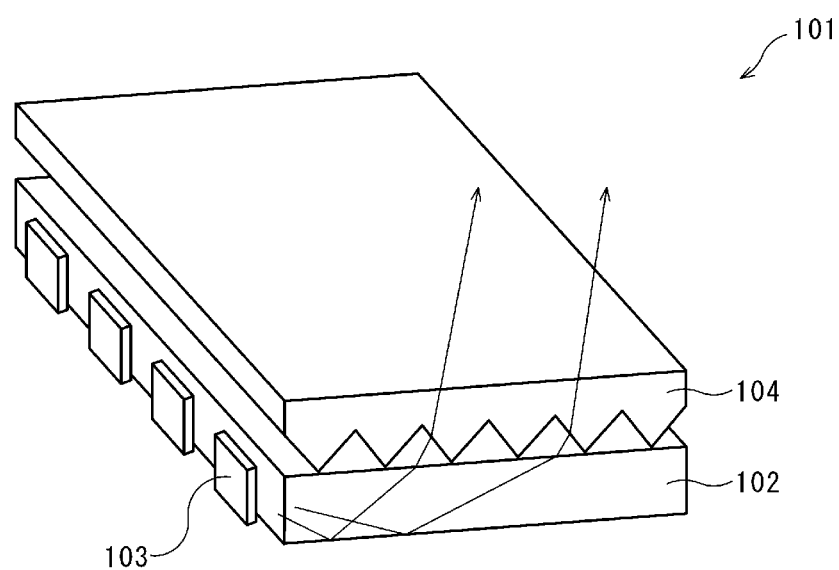
F I G. 13

PRISM SHEET FOR BACKLIGHT UNIT AND BACKLIGHT UNIT FOR LIQUID CRYSTAL DISPLAY DEVICE

BACKGROUND OF THE INVENTION

The present invention relates to a prism sheet for a backlight unit, and a backlight unit for a liquid crystal display device.

DESCRIPTION OF THE RELATED ART

Liquid crystal display devices have been widely used as flat panel displays, taking advantage of characteristic features such as thinness, lightweight properties, low electric power consumption, etc. Intended usages of liquid crystal display devices are becoming more and more diverse, and include televisions, personal computers, mobile phone terminals such as smartphones, tablet terminals, and the like. Such liquid crystal display devices each include a backlight unit that irradiates a liquid crystal panel from an inferior face side, such as an edge-lit (side-lit) backlight unit, a direct-lit backlight unit, or the like.

A known edge-lit backlight unit for the liquid crystal display device is provided with: an optical waveguide sheet 102; a plurality of LEDs 103 that are arranged along one end face of the optical waveguide sheet 102; and a prism sheet (hereinafter, may be also referred to as "inverse prism sheet") 104 that is overlaid on an upper face of the optical waveguide sheet 102 and has a prism array on an inferior face, as shown in FIG. 13 (see Japanese Unexamined Patent Application, Publication No. 2007-148081). The prism array of the inverse prism sheet 104 provides an optical function of directing rays of light vertically, by refracting rays of light having exited from the optical waveguide sheet 102 to be oriented toward approximately a vertical direction (normal direction of the prism sheet).

In the edge-lit backlight unit 101 shown in FIG. 13, the plurality of LEDs 103 are arranged along the one end face of the optical waveguide sheet 102, and therefore rays of light exiting from the upper face of the optical waveguide sheet 102 include a large number of rays of light inclined toward an emission direction of the LEDs 103. Meanwhile, the prism array of the inverse prism sheet 104 refracts the rays of light toward a direction perpendicular to a ridge line direction thereof. Consequently, the inverse prism sheet 104 is disposed in such a way that an orientation direction of the prism array (ridge line direction) is perpendicular to the emission direction of the LEDs 103, i.e., parallel to the one end face of the optical waveguide sheet 102 along which the plurality of LEDs 103 are arranged. The inverse prism sheet 104 thus disposed is capable of refracting the rays of light having exited from the optical waveguide sheet 102 to be oriented toward approximately the vertical direction, thereby enabling a luminance of the edge-lit backlight unit 101 in a front direction to be improved.

PRIOR ART DOCUMENTS

Patent Documents

Patent Document 1: Japanese Unexamined Patent Application, Publication No. 2007-148081

SUMMARY OF THE INVENTION

As a result of a thorough investigation, the present inventors found that the edge-lit backlight unit 101 as described above utilizing the LEDs 103 and provided with the inverse prism sheet 104 results in a narrow viewing angle in a direction perpendicular to the orientation direction of the prism array. Although the reason for the narrow viewing angle has not necessarily been made clear, the reason is speculated to be the light condensing characteristics of the inverse prism sheet 104. Specifically, it is inferred that, even though the rays of light having exited from the optical waveguide sheet 102 have a certain breadth, the inverse prism sheet 104 condenses in the vertical direction the breadth of the rays of light in the direction perpendicular to the orientation direction of the prism array, and consequently the rays of light exiting from the inverse prism sheet 104 have a small breadth in the direction perpendicular to the orientation direction of the prism array, resulting in the narrow viewing angle in the direction perpendicular to the orientation direction of the prism array. It is also inferred that, due to the LEDs 103 emitting highly directive rays of light, the light condensing characteristics of the inverse prism sheet 104 is more remarkable.

In order to secure the viewing angle in the direction perpendicular to the orientation direction of the prism array, a prism array having a polygonal cross-sectional shape can be employed, for example; however, forming such a prism array having a polygonal cross-sectional shape is difficult and may involve a high production cost. Alternatively, providing a diffusion layer such as a beads-coated layer on the upper face of the inverse prism sheet may be conceived; however, such a diffusion layer diffuses the rays of light not only in the direction perpendicular to the orientation direction of the prism array but also in the direction of the orientation direction of the prism array, leading to reduction in luminance in the front direction.

The present invention was made in view of the foregoing circumstances, and an object of the present invention is to provide a prism sheet for a backlight unit and a backlight unit that are capable of attaining desired luminance in the front direction, and securing a sufficient viewing angle in the direction perpendicular to the orientation direction of the prism array.

The prism sheet for a backlight unit according to an aspect of the present invention made for solving the aforementioned problems includes one or more resin layers, an outermost resin layer of the one or more resin layers being provided with a prism array, wherein on a surface of at least one of the one or more resin layers, a large number of micro linear grooves are formed to be parallel to, or to intersect at an acute angle with, an orientation direction of the prism array.

The prism sheet for a backlight unit, for example when used as an inverse prism sheet in a backlight unit in which an LED is employed as a light source, is capable of attaining desired luminance in the front direction, and ensuring a sufficient viewing angle in the direction perpendicular to the orientation direction of the prism array. Although the reason for the aforementioned effects has not necessarily been made clear, the following reason can be speculated: rays of light having been incident through the prism array and having reached a region where the large number of micro linear grooves are formed, are diffused in a width direction of the micro linear grooves, i.e., in the direction perpendicular to the orientation direction of the prism array.

It is preferred that an average number of existing micro linear grooves per unit length in a direction perpendicular to an average orientation direction of the large number of micro linear grooves is no less than 30/mm and no greater than 10,000/mm. When the average number of existing micro linear grooves per unit length in the direction perpendicular to the average orientation direction of the large number of micro linear grooves falls within the above range, the rays of light having reached the region where the large number of micro linear grooves are formed are likely to be diffused sufficiently in the width direction of the large number of micro linear grooves.

It is preferred that the large number of micro linear grooves are irregular in length, width or pitch. Due to the large number of micro linear grooves being irregular in length, width or pitch, the liquid crystal display device provided with the prism sheet for a backlight unit is capable of inhibiting iridescent unevenness, which may be otherwise caused by the large number of micro linear grooves.

It is preferred that an arithmetic average roughness (Ra) of the surface on which the large number of micro linear grooves are formed with respect to the direction perpendicular to the average orientation direction of the large number of micro linear grooves is no less than 0.5 μm and no greater than 10 μm. When the arithmetic average roughness (Ra) of the surface on which the large number of micro linear grooves are formed with respect to the direction perpendicular to the average orientation direction of the large number of micro linear grooves falls within the above range, the rays of light having reached the region where the large number of micro linear grooves are formed are likely to be diffused sufficiently in the width direction of the micro linear grooves.

It is preferred that the large number of micro linear grooves are formed on an interface of an adjacent resin layer, and that a difference in refractive index between layers on both sides of the interface is no less than 0.01. When the large number of micro linear grooves are formed on the interface of the adjacent resin layer, and the difference in refractive index between layers on both sides of the interface falls within the above range, the rays of light having reached the region where the large number of micro linear grooves are formed are likely to be diffused sufficiently in the width direction of the micro linear grooves, due to the difference in refractive index between layers on both sides of the interface.

It is preferred that the large number of micro linear grooves constitute a diffraction grating. When the large number of micro linear grooves constitute the diffraction grating, a diffraction phenomenon occurs, in other words the rays of light having passed through the region where the large number of micro linear grooves are formed have certain different optical path lengths. Consequently, the rays of light having reached the region where the large number of micro linear grooves are formed are likely to be diffused sufficiently in the width direction of the micro linear grooves, due to the diffraction phenomenon.

A backlight unit for a liquid crystal display device according to another aspect of the present invention made for solving the aforementioned problems includes: a light guide film that guides rays of light having entered from one end face toward an upper face side; at least one LED that is arranged along the one end face of the light guide film; and a prism sheet that is arranged on the upper face side of the light guide film, with a face having a prism array being directed downward, wherein the aforementioned prism sheet for a backlight unit is used as the prism sheet, and the one end face along which the LED is arranged is positioned parallel to the prism array on the prism sheet.

Due to the aforementioned prism sheet for a backlight unit serving as an inverse prism sheet in which the one end face of the light guide film along which the LED is arranged is positioned parallel to the prism array, the backlight unit for a liquid crystal display device is capable of attaining desired luminance in the front direction, and securing a sufficient viewing angle in the direction perpendicular to the orientation direction of the prism array, as described above.

It is to be noted that the term "upper face side" as referred to means a viewer's side of a liquid crystal display device, and the term "inferior face side" as referred to means the opposite side thereof. The term "average orientation direction of the large number of micro linear grooves" as referred to means an average of orientation directions of straight lines passing through both longitudinal ends of arbitrarily selected 20 micro linear grooves. In addition, the term "average number of existing micro linear grooves" as referred to in connection with the large number of micro linear grooves means an average of the numbers of existing micro linear grooves at arbitrary 10 positions. The term "arithmetic average roughness (Ra)" as referred to means a value as determined according to JIS-B0601:1994, with a cut-off (λc) of 0.8 mm and an evaluation length of 4 mm. The term "refractive index" as referred to means a refractive index for light having a wavelength of 589.3 nm (sodium D-line) which is an average of three measurements conducted at a temperature of 23° C., using a plate-like test piece of 70 mm on a side and 2 mm in thickness. The term "diffraction grating" as referred to is not limited to a structure of which optical properties are strictly adjusted, but means a structure that causes diffraction of incident light in a broad sense.

As explained in the foregoing, the prism sheet for a backlight unit and the backlight unit of the aspects of the present invention are capable of attaining desired luminance in the front direction, and securing a sufficient viewing angle in the direction perpendicular to the orientation direction of the prism array.

BRIEF DESCRIPTION OF THE DRAWINGS

FIG. 2 is a schematic end view illustrating the backlight unit of FIG. 1;

FIG. 3 is a schematic plan view illustrating an inverse prism sheet viewed from a direction perpendicular to a ray direction of a plurality of LEDs in the backlight unit of FIG. 1, FIG. 4 is a partial enlarged end view of the inverse prism sheet of FIG. 3 taken along the line A-A;

FIG. 5 is a schematic lateral view for explaining a function of expanding a viewing angle provided by the backlight unit of FIG. 1;

FIG. 6 is a schematic end view illustrating an inverse prism sheet according to an embodiment other than the inverse prism sheet shown in FIG. 3;

FIG. 9 is a schematic end view illustrating an inverse prism sheet according to an embodiment other than the inverse prism sheets shown in FIGS. 3 and 6 to 8;

FIG. 10 is a schematic end view illustrating micro linear grooves according to another embodiment of the present invention;

FIG. 11 is a schematic end view illustrating micro linear grooves according to an embodiment other than the micro linear grooves shown in FIG. 10;

FIG. 12 is a schematic end view illustrating micro linear grooves according to an embodiment other than the micro linear grooves shown in FIGS. 10 and 11; and FIG. 13 is a schematic perspective view illustrating a conventional edge-lit backlight unit.

DESCRIPTION OF EMBODIMENTS

Hereinafter, embodiments of the present invention will be explained in more detail with appropriate references to the accompanying drawings.

First Embodiment

Backlight Unit

Figure 1:
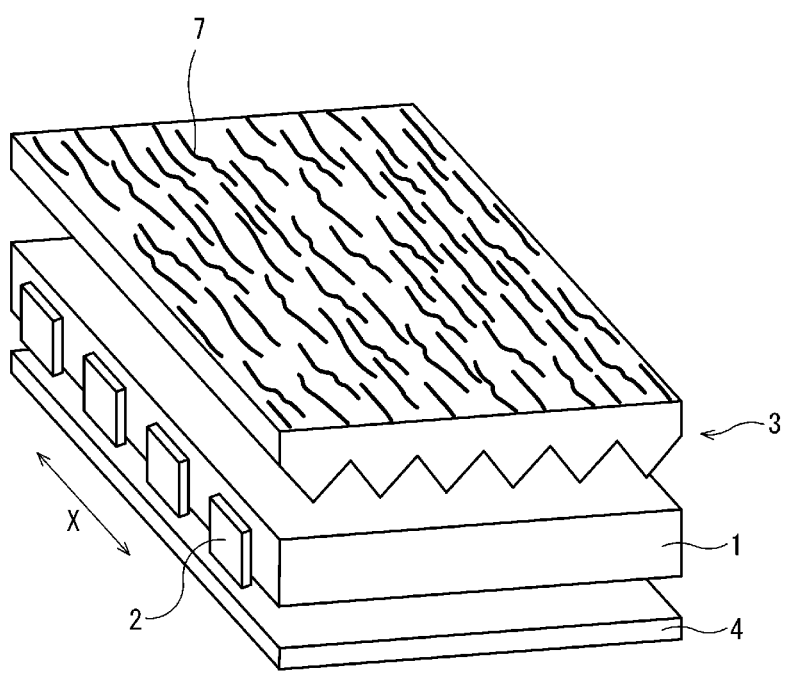
FIG. 1 is a schematic perspective view illustrating a backlight unit according to an embodiment of the present invention.

The backlight unit for a liquid crystal display device of FIGS. 1 and 2 is an edge-lit backlight unit in which an LED is employed as a light source. The backlight unit includes: a light guide film 1 that guides rays of light having entered from one end face toward an upper face side; a plurality of LEDs 2 arranged along the one end face of the light guide film 1; and the prism sheet for a backlight unit disposed on the upper face side of the light guide film 1 and provided with a prism array 6 on one external surface. The prism sheet for a backlight unit is an inverse prism sheet 3 that is disposed in such a way that the surface having the prism array 6 is directed downward. The prism sheet 3 is overlaid directly (without any other sheet, etc. being interposed) onto the upper face of the light guide film 1. The one end face of the light guide film 1 along which the plurality of LEDs 2 are arranged is positioned parallel to the prism array 6 of the inverse prism sheet 3. The backlight unit further includes a reflection sheet 4 disposed on the inferior face side of the light guide film 1.

Inverse Prism Sheet

The inverse prism sheet 3 guides the rays of light having exited from the upper face side of the light guide film 1 toward the vertical direction (normal direction of the inverse prism sheet 3). The inverse prism sheet 3 is formed in a substantially rectangular shape in a planar view. The inverse prism sheet 3 includes a substrate layer 5 and the prism array 6 that is overlaid on the inferior face of the substrate layer 5. The inverse prism sheet 3 is constituted from the substrate layer 5 and the prism array 6 that is overlaid directly on the substrate layer 5 (in other words, the substrate layer 5 and the prism array 6 are integrally formed, without any other layer). The prism array 6 is a resin layer constituted from a plurality of protruding-streak prism portions 6a arranged in parallel, and disposed as an outermost layer of the inverse prism sheet 3. In addition, as shown in FIGS. 3 and 4, a large number of micro linear grooves 7 are formed on the surface (upper face of the substrate layer 5) of the inverse prism sheet 3, so as to be parallel to, or to intersect at an acute angle with, an orientation direction of the prism array 6 (ridge line direction) in a planar view.

Substrate Layer

The upper face of the substrate layer 5 constitutes an external surface of the inverse prism sheet 3. The large number of micro linear grooves 7 are formed on one external surface (upper face) of the inverse prism sheet 3. The large number of micro linear grooves 7 are formed as hair-line-like rows. In the inverse prism sheet 3, due to the large number of micro linear grooves 7 being formed on the external surface, the rays of light having reached the region where the large number of micro linear grooves 7 are formed are likely to be diffused sufficiently in the width direction of the micro linear grooves 7, by virtue of a difference in refractive index between the external surface on which the large number of micro linear grooves 7 are formed and an air layer being present on an external side of the external surface.

The large number of micro linear grooves 7 may constitute the diffraction grating. In the inverse prism sheet 3, when the large number of micro linear grooves 7 constitute the diffraction grating, a diffraction phenomenon occurs, in other words, the rays of light having passed through the region where the large number of micro linear grooves 7 are formed have certain different optical path lengths. Consequently, the rays of light having reached the region where the large number of micro linear grooves 7 are formed are likely to be diffused sufficiently in the width direction of the micro linear grooves 7, due to the diffraction phenomenon.

The large number of micro linear grooves 7 are formed substantially evenly (at substantially the same density) over an entire region of the upper face of the substrate layer 5. The micro linear grooves 7 each have a substantially U-shaped cross section (in other words, the micro linear grooves 7 each do not have a triangular cross section). The upper limit of an inclination angle of each micro linear groove 7 with respect to the orientation direction of the prism array 6 (direction X in FIG. 1) is preferably ±30°, more preferably ±15°, and still more preferably ±5°. Furthermore, the micro linear grooves 7 may be each randomly oriented within the aforementioned range of inclination angle (in other words, orientation directions of the micro linear grooves 7 are not required to be strictly identical to each other). Due to the micro linear grooves 7 each being randomly oriented, inhibition of the iridescent unevenness in the liquid crystal display device caused by the large number of micro linear grooves 7 is enabled. It is to be noted that, although the large number of micro linear grooves 7 are preferably formed independently from each other for the purpose of controlling the diffusion direction of the rays of light, a part of the micro linear grooves 7 may intersect with each other.

As described above, the large number of micro linear grooves 7 are parallel to, or intersect at an acute angle with, an orientation direction of the prism array 6 in a planar view. The upper limit of an average inclination angle of the large number of micro linear grooves 7 with respect to the orientation direction of the prism array 6 in a planar view is preferably ±30°, more preferably ±15°, still more preferably ±5°, and particularly preferably 0°. When the average inclination angle is greater than the upper limit, it may be difficult to secure a sufficient viewing angle in the direction perpendicular to the orientation direction of the prism array 6. The term "average inclination angle of the large number of micro linear grooves with respect to the orientation direction of the prism array" as referred to means an average of inclination angles of straight lines passing through both longitudinal ends of arbitrarily selected 20 micro linear grooves with respect to the orientation direction of the prism array.

As shown in FIG. 3, lengths $L_1$ of the large number of micro linear grooves 7 are preferably irregular. Due to the lengths $L_1$ of the large number of micro linear grooves 7 being irregular, the inverse prism sheet 3 is capable of inhibiting in the liquid crystal display device the iridescent unevenness, which may be otherwise caused by the large number of micro linear grooves 7.

The lower limit of an average length of the large number of micro linear grooves 7 is preferably a value no less than twice, and more preferably a value no less than three times an average width of the large number of micro linear grooves 7. Meanwhile, the upper limit of the average length of the large number of micro linear grooves 7 is not particularly limited and the large number of micro linear grooves 7 may be continuous between both ends of the substrate layer 5. For example, the upper limit of the average length is preferably a value no greater than 10,000 times and more preferably a value no greater than 5,000 times the average width. When the average length of the large number of micro linear grooves 7 is less than the lower limit, the amount of rays of light diffused in the width direction of the large number of micro linear grooves 7 may not be sufficiently increased with respect to the amount of rays of light having reached the region where the large number of micro linear grooves 7 are formed. To the contrary, when the average length of the large number of micro linear grooves 7 is greater than the upper limit, it may be difficult to form the large number of micro linear grooves 7 in the random orientation directions and in high density, so as to inhibit the iridescent unevenness in the liquid crystal display device. It is to be noted that the term "average length of the large number of micro linear grooves" as referred to means an average of lengths of arbitrarily selected 20 micro linear grooves on an average interface of a face on which the arbitrary micro linear grooves are formed.

Widths $L_2$ of the large number of micro linear grooves 7 are preferably irregular. Furthermore, as shown in FIG. 3, the width $L_2$ of each micro linear groove 7 preferably varies randomly along the longitudinal direction of the micro linear groove 7. Due to the width $L_2$ of the large number of micro linear grooves 7 being irregular and random, the inverse prism sheet 3 is capable of inhibiting in the liquid crystal display device the iridescent unevenness, which may be otherwise caused by the large number of micro linear grooves 7.

The lower limit of an average width of the large number of micro linear grooves 7 is preferably 10 nm, more preferably 50 nm, still more preferably 100 nm, and particularly preferably 5 μm. Meanwhile, the upper limit of the average width of the large number of micro linear grooves 7 is preferably 100 μm, more preferably 75 μm, still more preferably 50 μm, and particularly preferably 40 μm. When the average width of the large number of micro linear grooves 7 is less than the lower limit, formability of the micro linear grooves 7 may be decreased. To the contrary, when the average width of the large number of micro linear grooves 7 is greater than the upper limit, the amount of rays of light diffused in the width direction of the large number of micro linear grooves 7 may not be secured sufficiently. It is to be noted that each micro linear groove 7 is preferably formed such that the width varies randomly within the aforementioned range, along the longitudinal direction. When each micro linear groove 7 is formed such that the width varies randomly within the aforementioned range, prevention of moire caused by interference from other members (a prism sheet, a liquid crystal cell, etc.) having cyclic pitch; and prevention of regularly occurring color separation, in turn the iridescent unevenness, are enabled. It is to be noted that the term "average width of the large number of micro linear grooves" as referred to means an average of widths, at arbitrary points (except for the longitudinal ends), of arbitrarily selected 20 micro linear grooves on the average interface of the face on which the arbitrary micro linear grooves are formed.

The pitch of the large number of micro linear grooves 7 is preferably irregular. Due to the pitch of the large number of micro linear grooves 7 being irregular, the inverse prism sheet 3 is capable of inhibiting in the liquid crystal display device the iridescent unevenness, which may be otherwise caused by the large number of micro linear grooves 7. It is to be noted that the term "pitch of the large number of micro linear grooves" as referred to means an interval between adjacent micro linear grooves, along a straight line perpendicular to the average orientation direction of the large number of micro linear grooves.

The lower limit of an average pitch of the large number of micro linear grooves 7 is preferably 10 nm, more preferably 50 nm, still more preferably 100 nm, particularly preferably 1 μm, and still particularly preferably 5 μm. Meanwhile, the upper limit of the average pitch of the large number of micro linear grooves 7 is preferably 100 μm, more preferably 75 μm, still more preferably 50 μm, and particularly preferably 40 μm. When the average pitch of the large number of micro linear grooves 7 is less than the lower limit, formability of the large number of micro linear grooves 7 may be decreased. To the contrary, when the average pitch of the large number of micro linear grooves 7 is greater than the upper limit, the amount of rays of light diffused in the width direction of the large number of micro linear grooves 7 may not be increased sufficiently. It is to be noted that the term "average pitch of the large number of micro linear grooves" as referred to means an average of pitch of 20 adjacent micro linear grooves, along a straight line perpendicular to the average orientation direction of the large number of micro linear grooves.

The upper limit of a standard deviation of the pitch of the large number of micro linear grooves 7 is preferably 10 μm, more preferably 9 μm, and still more preferably 7 μm. When the standard deviation of the pitch of the large number of micro linear grooves 7 is greater than the upper limit, the pitch of the large number of micro linear grooves 7 may be too irregular, and consequently the amount of rays of light diffused in the width direction of the large number of micro linear grooves 7 may not be increased evenly over the entire region where the large number of micro linear grooves 7 are formed. Meanwhile, the lower limit of the standard deviation of the pitch of the large number of micro linear grooves 7 can be set to be 4 μm, for example, in light of easy arrangement of the large number of micro linear grooves 7 in comparatively random directions. It is to be noted that the term "standard deviation of the pitch of the large number of micro linear grooves" as referred to means a standard deviation of the pitch of arbitrarily selected 20 micro linear grooves.

In addition, the average width and the average pitch of the large number of micro linear grooves 7 preferably fall within the aforementioned ranges. Due to the average width and the average pitch of the large number of micro linear grooves 7 falling within the aforementioned ranges, the inverse prism sheet 3 is capable of sufficiently increasing the amount of rays of light diffused in the width direction of the large number of micro linear grooves 7.

The lower limit of a ratio of the average pitch of the large number of micro linear grooves 7 to an average pitch of the prism array 6 (described later) is preferably 0.005, more preferably 0.01, and still more preferably 0.1. Meanwhile, the upper limit of a ratio of the average pitch of the large number of micro linear grooves 7 to the average pitch of the prism array 6 is preferably 0.6, more preferably 0.5, and still more preferably 0.4. Due to the ratio falling within the above range, the large number of micro linear grooves 7 are formed substantially evenly in high density, enabling the sufficient expansion of the viewing angle in the direction perpendicular to the orientation direction of the prism array 6.

The lower limit of the average number of existing micro linear grooves 7 per unit length in the direction perpendicular to the average orientation direction of the large number of micro linear grooves 7 is preferably 10/mm, more preferably 20/mm, still more preferably 30/mm, particularly preferably 50/mm, and still particularly preferably 200/mm. Meanwhile, the upper limit of the average number of existing micro linear grooves 7 is preferably 10,000/mm, more preferably 5,000/mm, still more preferably 3,000/mm, and particularly preferably 1,100/mm. When the average number of existing micro linear grooves 7 is less than the lower limit, the amount of rays of light diffused in the width direction of the large number of micro linear grooves 7 may not be sufficiently increased with respect to the amount of rays of light having reached the region where the large number of micro linear grooves 7 are formed. To the contrary, when the number of existing micro linear grooves 7 is greater than the upper limit, formability of the large number of micro linear grooves 7 may be decreased.

The lower limit of an average depth $D_1$ of the large number of micro linear grooves 7 is preferably 10 nm, more preferably 500 nm, still more preferably 1 μm, and particularly preferably 2 μm. Meanwhile, the upper limit of the average depth $D_1$ of the large number of micro linear grooves 7 is preferably 50 μm, more preferably 40 μm, and still more preferably 30 μm. When the average depth $D_1$ of the large number of micro linear grooves 7 is less than the lower limit, the amount of rays of light diffused in the width direction of the large number of micro linear grooves 7 may not be increased sufficiently. To the contrary, when the average depth $D_1$ of the large number of micro linear grooves 7 is greater than the upper limit, the strength of the substrate layer 5 may be decreased. It is to be noted that the term "average depth of the large number of micro linear grooves" as referred to means an average of depths of arbitrarily selected 20 micro linear grooves from an average interface of the resin layer to a bottom thereof.

The upper limit of a standard deviation of the depths of the large number of micro linear grooves 7 is preferably 4 μm, more preferably 3 μm, and still more preferably 2.5 μm. When the standard deviation of the depths of the large number of micro linear grooves 7 is greater than the upper limit, the depths of the large number of micro linear grooves 7 may be too irregular, and consequently the amount of rays of light diffused in the width direction of the large number of micro linear grooves 7 may not be increased evenly over the entire region where the large number of micro linear grooves 7 are formed. Meanwhile, the lower limit of the standard deviation of the depths of the large number of micro linear grooves 7 is not particularly limited, and may be, for example, 0.3 μm. It is to be noted that the term "standard deviation of the depths of the large number of micro linear grooves" as referred to means a standard deviation of the depths of arbitrarily selected 20 micro linear grooves.

The lower limit of the arithmetic average roughness (Ra) of the external surface on which the large number of micro linear grooves 7 are formed (upper face of the substrate layer 5) with respect to the direction parallel to the orientation direction of the large number of micro linear grooves 7 is preferably 0.005 μm, more preferably 0.05 μm, and still more preferably 0.1 μm. Meanwhile, the upper limit of the arithmetic average roughness (Ra) of the external surface on which the large number of micro linear grooves 7 are formed (upper face of the substrate layer 5) with respect to the direction parallel to the orientation direction of the large number of micro linear grooves 7 is preferably 1.5 μm, more preferably 1.2 μm, and still more preferably 1 μm. When the arithmetic average roughness (Ra) is less than the lower limit, an effect of expanding the viewing angle in the direction perpendicular to the orientation direction of the prism array 6, due to the micro linear grooves 7 that are inclined at an acute angle with respect to the orientation direction of the prism array 6, may be insufficient. To the contrary, when the arithmetic average roughness (Ra) is greater than the upper limit, the amount of rays of light diffused in directions parallel to the orientation directions of the large number of micro linear grooves 7 with respect to the amount of rays of light diffused in the width direction of the large number of micro linear grooves 7 may be large, and the sufficient viewing angle in the direction perpendicular to the orientation direction of the prism array 6 may not be secured.

The lower limit of the arithmetic average roughness (Ra) of the external surface on which the large number of micro linear grooves 7 are formed (upper face of the substrate layer 5) with respect to the direction perpendicular to the orientation direction of the large number of micro linear grooves 7 is preferably 0.01 μm, more preferably 0.1 μm, still more preferably 0.5 μm, and particularly preferably 1.0 μm. Meanwhile, the upper limit of the arithmetic average roughness (Ra) of the external surface on which the large number of micro linear grooves 7 are formed (upper face of the substrate layer 5) with respect to the direction perpendicular to the orientation direction of the large number of micro linear grooves 7 is preferably 20 μm, more preferably 10 μm, and still more preferably 5 μm. When the arithmetic average roughness (Ra) is less than the lower limit, the sufficient increase of the amount of rays of light diffused in the width direction of the large number of micro linear grooves 7 may not be enabled. To the contrary, when the arithmetic average roughness (Ra) is greater than the upper limit, an emission angle of the rays of light may be difficult to control.

Furthermore, it is preferable that the arithmetic average roughness (Ra) with respect to the direction parallel to the orientation direction of the large number of micro linear grooves 7, and the arithmetic average roughness (Ra) with respect to the direction perpendicular to the orientation direction of the large number of micro linear grooves 7, of the external surface on which the large number of micro linear grooves 7 are formed (upper face of the substrate layer 5) fall within the above respective ranges. Due to the arithmetic average roughness (Ra) with respect to the direction parallel to the orientation direction of the large number of micro linear grooves 7 and the arithmetic average roughness (Ra) with respect to the direction perpendicular to the orientation direction of the large number of micro linear grooves 7 falling within the above respective ranges, the inverse prism sheet 3 is capable of sufficiently increasing the amount of the rays of light diffused in the width direction of the large number of micro linear grooves 7, and in turn sufficiently expanding the viewing angle in the direction perpendicular to the orientation direction of the prism array 6.

The lower limit of a difference between the arithmetic average roughness (Ra) with respect to the direction perpendicular to the orientation direction of the large number of micro linear grooves 7 and the arithmetic average roughness (Ra) with respect to the direction parallel to the orientation direction, of the large number of micro linear grooves 7 of the external surface on which the large number of micro linear grooves 7 are formed (upper face of the substrate layer 5) is preferably 0.5 μm, more preferably 0.7 μm, and still more preferably 1 μm. When the difference in the arithmetic average roughness (Ra) is no less than the lower limit, the amount of the rays of light diffused in the width direction of the large number of micro linear grooves 7 is sufficiently increased, facilitating the sufficient expansion of the viewing angle in the direction perpendicular to the orientation direction of the prism array 6. Meanwhile, the upper limit of the difference in the arithmetic average roughness (Ra) may be, for example, 1.9 μm.

The lower limit of the maximum height (Ry) with respect to the direction parallel to the orientation direction of the large number of micro linear grooves 7 on the external surface on which the large number of micro linear grooves 7 are formed (upper face of the substrate layer 5) is preferably 0.1 μm, more preferably 1 μm, and still more preferably 1.5 μm. Meanwhile, the upper limit of the maximum height (Ry) with respect to the direction parallel to the orientation direction of the large number of micro linear grooves 7 on the external surface on which the large number of micro linear grooves 7 are formed (upper face of the substrate layer 5) is preferably 3 μm, more preferably 2.5 μm, and still more preferably 2 μm. When the maximum height (Ry) is less than the lower limit, an effect of expanding the viewing angle in the direction perpendicular to the orientation direction of the prism array 6, due to the micro linear grooves 7 that are inclined at an acute angle with respect to the orientation direction of the prism array 6, may be insufficient. To the contrary, when the maximum height (Ry) is greater than the upper limit, the amount of rays of light diffused in directions parallel to the orientation directions of the large number of micro linear grooves 7 with respect to the amount of rays of light diffused in the width direction of the large number of micro linear grooves 7 may be large, and the sufficient viewing angle in the direction perpendicular to the orientation direction of the prism array 6 may not be secured. It is to be noted that the term "maximum height (Ry)" as referred to means a value as determined according to JIS-B0601:1994, with a cut-off (λc) of 0.8 mm and an evaluation length of 4 mm.

The lower limit of the maximum height (Ry) with respect to the direction perpendicular to the orientation direction of the large number of micro linear grooves 7 on the external surface on which the large number of micro linear grooves 7 are formed (upper face of the substrate layer 5) is preferably 4 μm, more preferably 5 μm, and still more preferably 6 μm. Meanwhile, the upper limit of the maximum height (Ry) with respect to the direction perpendicular to the orientation direction of the large number of micro linear grooves 7 on the external surface on which the large number of micro linear grooves 7 are formed (upper face of the substrate layer 5) is preferably 12 μm, more preferably 10 μm, and still more preferably 9 μm. When the maximum height (Ry) is less than the lower limit, the sufficient increase of the amount of rays of light diffused in the width direction of the large number of micro linear grooves 7 may not be enabled. To the contrary, when the maximum height (Ry) is greater than the upper limit, the emission angle of the rays of light may be difficult to control.

The lower limit of a difference between the maximum height (Ry) with respect to the direction perpendicular to the orientation direction of the large number of micro linear grooves 7 and the maximum height (Ry) with respect to the direction parallel to the orientation direction of the large number of micro linear grooves 7 on the external surface on which the large number of micro linear grooves 7 are formed (upper face of the substrate layer 5) is preferably 4 μm, more preferably 5 μm, and still more preferably 6 μm. When the difference in the maximum height (Ry) is no less than the lower limit, the amount of the rays of light diffused in the width direction of the large number of micro linear grooves 7 is sufficiently increased, facilitating the sufficient expansion of the viewing angle in the direction perpendicular to the orientation direction of the prism array 6. Meanwhile, the upper limit of the difference in the maximum heights (Ry) may be, for example, 11 μm.

The lower limit of a ten-point mean roughness (Rz) of the external surface on which the large number of micro linear grooves 7 are formed (upper face of the substrate layer 5) with respect to the direction parallel to the orientation direction of the large number of micro linear grooves 7 is preferably 0.1 μm, more preferably 0.5 μm, and still more preferably 1 μm. Meanwhile, the upper limit of the ten-point mean roughness (Rz) of the external surface on which the large number of micro linear grooves 7 are formed (upper face of the substrate layer 5) with respect to the direction parallel to the orientation direction of the large number of micro linear grooves 7 is preferably 2.5 μm, more preferably 2 μm, and still more preferably 1.5 μm. When the ten-point mean roughness (Rz) is less than the lower limit, an effect of expanding the viewing angle in the direction perpendicular to the orientation direction of the prism array 6, due to the micro linear grooves 7 that are inclined at an acute angle with respect to the orientation direction of the prism array 6, may be insufficient. To the contrary, when the ten-point mean roughness (Rz) is greater than the upper limit, the amount of rays of light diffused in directions parallel to the orientation directions of the large number of micro linear grooves 7 with respect to the amount of rays of light diffused in the width direction of the large number of micro linear grooves 7 may be large, and the sufficient viewing angle in the direction perpendicular to the orientation direction of the prism array 6 may not be secured. It is to be noted that the term "ten-point mean roughness (Rz)" as referred to means a value as determined according to JIS-B0601:1994 with a cut-off (λc) of 0.8 mm and an evaluation length of 4 mm.

The lower limit of a ten-point mean roughness (Rz) of the external surface on which the large number of micro linear grooves 7 are formed (upper face of the substrate layer 5) with respect to the direction perpendicular to the orientation direction of the large number of micro linear grooves 7 is preferably 4 μm, more preferably 5 μm, and still more preferably 6 μm. Meanwhile, the upper limit of the ten-point mean roughness (Rz) of the external surface on which the large number of micro linear grooves 7 are formed (upper face of the substrate layer 5) with respect to the direction perpendicular to the orientation direction of the large number of micro linear grooves 7 is preferably 10 μm, more preferably 8 μm, and still more preferably 7 μm. When the ten-point mean roughness (Rz) is less than the lower limit, the sufficient increase of the amount of rays of light diffused in the width direction of the large number of micro linear grooves 7 may not be enabled. To the contrary, when the ten-point average roughness (Rz) is greater than the upper limit, the emission angle of the rays of light may be difficult to control.

The lower limit of a difference between the ten-point mean roughness (Rz) with respect to the direction perpendicular to the orientation direction of the large number of micro linear grooves 7 and the ten-point mean roughness (Rz) with respect to the direction parallel to the orientation direction of the large number of micro linear grooves 7, of the external surface on which the large number of micro linear grooves 7 are formed (upper face of the substrate layer 5) is preferably 3 µm, more preferably 4 µm, and still more preferably 4.5 µm. When the difference in the ten-point mean roughness (Rz) is no less than the lower limit, the amount of the rays of light diffused in the width direction of the large number of micro linear grooves 7 is sufficiently increased, facilitating the sufficient expansion of the viewing angle in the direction perpendicular to the orientation direction of the prism array 6. Meanwhile, the upper limit of the difference in the ten-point average roughness (Rz) may be, for example, 9 µm.

The lower limit of a root-mean-square slope (RΔq) with respect to the direction parallel to the orientation direction of the large number of micro linear grooves 7 on the external surface on which the large number of micro linear grooves 7 are formed (upper face of the substrate layer 5) is preferably 0.05, more preferably 0.2, still more preferably 0.25, and particularly preferably 0.3. Meanwhile, the upper limit of the root-mean-square slope (RΔq) with respect to the direction parallel to the orientation direction of the large number of micro linear grooves 7 on the external surface on which the large number of micro linear grooves 7 are formed (upper face of the substrate layer 5) is preferably 0.5, more preferably 0.45, and still more preferably 0.4. When the root-mean-square slope (RΔq) is less than the lower limit, an effect of expanding the viewing angle in the direction perpendicular to the orientation direction of the prism array 6, due to the micro linear grooves 7 that are inclined at an acute angle with respect to the orientation direction of the prism array 6, may be insufficient. To the contrary, when the root-mean-square slope (RΔq) is greater than the upper limit, the amount of rays of light diffused in directions parallel to the orientation directions of the large number of micro linear grooves 7 with respect to the amount of rays of light diffused in the width direction of the large number of micro linear grooves 7 may be large, and the sufficient viewing angle in the direction perpendicular to the orientation direction of the prism array 6 may not be secured. It is to be noted that the term "root-mean-square slope (RΔq)" as referred to means a value determined according to JIS-B0601:2001.

The lower limit of the root-mean-square slope (RΔq) with respect to the direction perpendicular to the orientation direction of the large number of micro linear grooves 7 on the external surface on which the large number of micro linear grooves 7 are formed (upper face of the substrate layer 5) is preferably 0.5, more preferably 0.7, and still more preferably 1. Meanwhile, the upper limit of the root-mean-square slope (RΔq) with respect to the direction perpendicular to the orientation direction of the large number of micro linear grooves 7 on the external surface on which the large number of micro linear grooves 7 are formed (upper face of the substrate layer 5) is preferably 2.5, more preferably 2, and still more preferably 1.8. When the root-mean-square slope (RΔq) is less than the lower limit, the sufficient increase of the amount of rays of light diffused in the width direction of the large number of micro linear grooves 7 may not be enabled. To the contrary, when the root-mean-square slope (RΔq) is greater than the upper limit, the emission angle of the rays of light may be difficult to control.

The lower limit of a difference between the root-mean-square slope (RΔq) with respect to the direction perpendicular to the orientation direction of the large number of micro linear grooves 7 and the root-mean-square slope (RΔq) with respect to the direction parallel to the orientation direction of the large number of micro linear grooves 7 on the external surface on which the large number of micro linear grooves 7 are formed (upper face of the substrate layer 5) is preferably 0.5, more preferably 0.7, and still more preferably 1. When the difference in the root-mean-square slope (RΔq) is no less than the lower limit, the amount of the rays of light diffused in the width direction of the large number of micro linear grooves 7 is sufficiently increased, facilitating the sufficient expansion of the viewing angle in the direction perpendicular to the orientation direction of the prism array 6. Meanwhile, the upper limit of the difference in the root-mean-square slope (RΔq) may be, for example, 2.2.

Since the substrate layer 5 needs to transmit rays of light, the substrate layer 5 is formed from a transparent synthetic resin, in particular a colorless and transparent synthetic resin, as a principal component. The principal component of the substrate layer 5 is not particularly limited, and exemplified by polyethylene terephthalate, polyethylene naphthalate, an acrylic resin, polycarbonate, polystyrene, polyolefin, cellulose acetate, weather resistance vinyl chloride, and the like. Of these, polyethylene terephthalate being superior in transparency and strength is preferred, and polyethylene terephthalate having an ameliorated deflection performance is particularly preferred. It is to be noted that the term "principal component" as referred to means a component included at the greatest content, and for example, a component included at a content of 50% by mass or greater.

The lower limit of an average thickness of the substrate layer 5 is preferably 10 µm, more preferably 35 µm, and still more preferably 50 µm. Meanwhile, the upper limit of the average thickness of the substrate layer 5 is preferably 500 µm, more preferably 250 µm, and still more preferably 188 µm. When the average thickness of the substrate layer 5 is less than the lower limit, strength of the inverse prism sheet 3 may be insufficient. To the contrary, when the average thickness of the substrate layer 5 is greater than the upper limit, the luminance of the backlight unit may be reduced, and a requirement of a reduction in thickness of the backlight unit may not be satisfied. It is to be noted that the term "average thickness" as referred to means an average of thicknesses of arbitrary 10 points.

The lower limit of a refractive index of the substrate layer 5 is preferably 1.51, more preferably 1.53, and still more preferably 1.55. Meanwhile, the upper limit of the refractive index of the substrate layer 5 is preferably 1.7, more preferably 1.67, and still more preferably 1.65. When the refractive index of the substrate layer 5 falls within the above range, due to a difference in refractive index between the substrate layer 5 and an air layer being present on an upper face side of the substrate layer 5, the amount of the rays of light diffused in the width direction of the large number of micro linear grooves 7 is sufficiently increased, facilitating the sufficient expansion of the viewing angle in the direction perpendicular to the orientation direction of the prism array 6.

Prism Array

As described above, the prism array 6 is constituted from the plurality of protruding-streak prism portions 6a arranged in parallel. The protruding-streak prism portions 6a are in a substantially identical shape, and each have a triangular prism shape. A cross-sectional shape of each protruding-streak prism portion 6a is not particularly limited, but is preferably an isosceles-triangular shape, a base of which is a face on which the substrate layer 5 is overlaid.

The lower limit of a pitch of the prism array 6 is preferably 20 µm, and more preferably 30 µm. Meanwhile, the upper limit of the pitch of the prism array 6 is preferably 100 µm and more preferably 60 µm. The lower limit of a height of the protruding-streak prism portion 6a is preferably 10 µm and more preferably 15 µm. Meanwhile, the upper limit of the height of the protruding-streak prism portion 6a is preferably 50 μm, and more preferably 30 μm.

The vertex angle of the protruding-streak prism portion 6a is preferably no less than 60° and no greater than 70°. The base angle of the protruding-streak prism portion 6a is preferably no less than 50° and no greater than 70°.

Since the prism array 6 needs to transmit rays of light, the prism array 6 is formed from a transparent synthetic resin, in particular a colorless and transparent synthetic resin as a principal component. The prism array 6 may be formed either integrally with the substrate layer 5 by using the same material as the substrate layer, or separately from the substrate layer 5.

The principal component of the prism array 6 is not particularly limited, and exemplified by synthetic resins similar to those exemplified in relation to the principal component of the substrate layer 5, and an active energy ray-curable resin. Examples of the active energy ray-curable resin include an ultraviolet ray-curable resin that is crosslinked and cured upon irradiation with ultraviolet ray, and an electron beam-curable resin that is crosslinked and cured upon irradiation with an electron beam. The active energy ray-curable resin can be appropriately selected from polymerizable monomers and polymerizable oligomers. Of these, acrylic, urethane, or acrylic urethane ultraviolet ray-curable resins are preferred as the active energy ray-curable resin, in light of likelihood of improvement of adhesiveness with the substrate layer 5.

As the polymerizable monomer, a (meth)acrylate monomer having a radical polymerizable unsaturated group in its molecule is suitably used, and in particular, a polyfunctional (meth)acrylate is preferred. The polyfunctional (meth)acrylate is not particularly limited as long as it is a (meth)acrylate having at least two ethylenic unsaturated bonds in its molecule. Specifically, ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalate neopentylglycol di(meth)acrylate, dicyclopentanyl di(meth)acrylate, caprolactone modified dicyclopentenyl di(meth)acrylate, ethylene oxide modified phosphate di(meth)acrylate, allylated cyclohexyl di(meth)acrylate, isocyanurate di(meth)acrylate, trimethylolpropane tri(meth)acrylate, ethylene oxide modified trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, tris(acryloxyethyl)isocyanurate, propionic acid modified dipentaerythritol penta(meth)acrylate, dipentaerythritol hexa(meth)acrylate, ethylene oxide modified dipentaerythritol hexa(meth)acrylate, caprolactone modified dipentaerythritol hexa(meth)acrylate, and the like are exemplified. These polyfunctional (meth)acrylates may be used alone, or in combination of two or more thereof. Of these, dipentaerythritol tri(meth)acrylate is preferred.

Furthermore, in addition to the polyfunctional (meth)acrylate, a monofunctional (meth)acrylate may be further included for the purpose of e.g., decreasing the viscosity. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate, and the like. These monofunctional (meth)acrylates may be used alone, or in combination of two or more thereof.

As the polymerizable oligomer, an oligomer having a radical polymerizable unsaturated group in its molecule is exemplified, and for example, an epoxy (meth)acrylate oligomer, a urethane (meth)acrylate oligomer, a polyester (meth)acrylate oligomer, a polyether (meth)acrylate oligomer and the like may be included.

The epoxy (meth)acrylate oligomer may be obtained by reacting, for example, an oxirane ring of a bisphenol epoxy resin or novolac epoxy resin having a comparatively low molecular weight with a (meth)acrylic acid to permit esterification. Alternatively, a carboxyl modified epoxy (meth)acrylate oligomer may be also used which is obtained by partially modifying the epoxy (meth)acrylate oligomer with a dibasic carboxylic anhydride. The urethane (meth)acrylate oligomer may be obtained by, for example, esterifying with a (meth)acrylic acid, a polyurethane oligomer obtained by a reaction of a polyether polyol and/or a polyester polyol with a polyisocyanate. The polyester (meth)acrylate oligomer may be obtained by, for example, esterifying with a (meth)acrylic acid, hydroxyl groups of a polyester oligomer having hydroxyl groups at both two ends obtained by condensation of a polyhydric carboxylic acid with a polyhydric alcohol. Alternatively, it is also possible to obtain the polyester (meth)acrylate oligomer by esterifying with a (meth)acrylic acid, hydroxyl groups at ends of an oligomer obtained by allowing an alkylene oxide to react with a polyhydric carboxylic acid. The polyether (meth)acrylate oligomer may be obtained by esterifying with a (meth)acrylic acid, hydroxyl groups of a polyether polyol.

Also, as the active energy ray-curable resin, an ultraviolet ray-curable epoxy resin may be suitably used. The ultraviolet ray-curable epoxy resin is exemplified by cured products of a bisphenol A epoxy resin, a glycidyl ether epoxy resin or the like.

When the ultraviolet ray-curable resin is used as the active energy ray-curable resin, it is desired that an initiator for photopolymerization is added in an amount of about 0.1 to 5 parts by mass with respect to 100 parts by mass of the resin. The initiator for photopolymerization is not particularly limited, and for the polymerizable monomer and/or the polymerizable oligomer having a radical polymerizable unsaturated group in its molecule, examples of the initiator include benzophenone, benzyl, Michler's ketone, 2-chlorothioxanthone, 2,4-diethylthioxanthone, benzoin ethyl ether, benzoin isopropyl ether, benzoin isobutyl ether, 2,2-diethoxyacetophenone, benzyl dimethyl ketal, 2,2-dimethoxy-1,2-diphenylethan-1-one, 2-hydroxy-2-methyl-1-phenylpropane-1-one, 1-hydroxycyclohexyl phenyl ketone, 2-methyl-1-[4-(methylthio)phenyl]-2-morpholinopropanone-1, 1-[4-(2-hydroxyethoxy)-phenyl]-2-hydroxy-2-methyl-1-propan-1-one, bis(cyclopentadienyl)-bis [2,6-difluoro-3-(pyrrol-1-yl)phenyl]titanium, 2-benzyl-2-dimethylamino-1-(4-morpholinophenyl)-butanone-1,2,4,6-trimethylbenzoyldiphenyl phosphine oxide, and the like. Moreover, for the polymerizable oligomer having a cation polymerizable functional group in its molecule, etc., examples of the initiator include aromatic sulfonium salts, aromatic diazonium salts, aromatic iodonium salts, metallocene compounds, benzoinsulfonic acid esters, and the like. It is to be noted that these compounds may be used each alone, or as a mixture of a plurality of the compounds.

Light Guide Film

The light guide film 1 allows the rays of light having entered from the end face to exit from the upper face substantially evenly. The light guide film 1 is formed into a plate (non-wedge shape) that is substantially rectangular-shaped in a planar view and has a substantially uniform thickness. The light guide film 1 includes a plurality of recessed parts 8 that are concave from the inferior face toward the upper face side. The light guide film 1 further includes sticking preventive parts on the inferior face. Specifically, the light guide film 1 includes a plurality of raised parts 9 as the sticking preventive parts, which are provided around the plurality of recessed parts 8 and protrude toward the inferior face side. The raised parts 9 are provided to be adjacent to the recessed parts 8, and the inner lateral face of each raised part 9 is continuous with the surface of the adjacent recessed part 8.

The lower limit of an average thickness of the light guide film 1 is preferably 100 μm, more preferably 150 μm, and still more preferably 200 μm. Meanwhile, the upper limit of the average thickness of the light guide film 1 is preferably 600 μm, more preferably 580 μm, and still more preferably 550 μm. When the average thickness of the light guide film 1 is less than the lower limit, the strength of the light guide film 1 may be insufficient, and the rays of light from the LED 2 may not be allowed to enter the light guide film 1 sufficiently. To the contrary, when the average thickness of the light guide film 1 is greater than the upper limit, the requirement of a reduction in thickness of the backlight unit may not be satisfied.

The plurality of recessed parts 8 serve as light scattering parts that scatter incident light toward the upper face side. Each recessed part 8 is formed in a substantially circular shape in a planar view. Furthermore, each recessed part 8 is formed so that the diameter thereof gradually decreases toward the upper face side. The shape of the recessed part 8 is not particularly limited, and may be hemispherical, hemi-ellipsoidal, conical, frustoconical, or the like. Of these, the shape of the recessed part 8 is preferably hemispherical or hemi-ellipsoidal. When the shape of the recessed part 8 is hemispherical or hemi-ellipsoidal, formability of the recessed part 8 can be improved, and the rays of light having entered the recessed part 8 can be favorably scattered.

The raised part 9 is formed to be continuous with the face perpendicular to a thickness direction of the light guide film 1 on the inferior face of the light guide film 1. Specifically, the raised part 9 is formed to be continuous with a flat face on the inferior face of the light guide film 1. The raised part 9 is formed in a substantially annular shape in a planar view so as to surround the recessed part 8. Due to the raised part 9 being formed in the substantially annular shape in a planar view so as to surround the recessed part 8, the light guide film 1 is capable of easily and reliably preventing sticking of the recessed part 8 as well as the vicinity of the recessed part 8 with the reflection sheet 4 disposed on the inferior face side of the light guide film 1.

The light guide film 1 is flexible. Due to the flexibility, the light guide film 1 is capable of inhibiting scuffs on the reflection sheet 4 disposed on the inferior face side. Since the light guide film 1 needs to transmit rays of light, the light guide film 1 is formed from a transparent synthetic resin, in particular a colorless and transparent synthetic resin as a principal component.

The principal component of the light guide film 1 is exemplified by polycarbonate, an acrylic resin, polyethylene terephthalate, polyethylene naphthalate, polystyrene, methyl (meth)acrylate-styrene copolymer, polyolefin, cycloolefin polymer, cycloolefin copolymer, cellulose acetate, weather resistant vinyl chloride, an active energy ray-curable resin, and the like. Of these, polycarbonate or an acrylic resin is preferred as the principal component of the light guide film 1. Due to containing polycarbonate having superior transparency and a high refractive index as a principal component, the light guide film 1 facilitates a total reflection on the upper and inferior faces of the light guide film 1, and enables efficient propagation of the rays of light. Furthermore, since polycarbonate is heat resistant, deterioration thereof due to heat generation of the LED 2 is less likely to occur. Moreover, polycarbonate has lower water absorbing properties as compared with acrylic resins and the like, and consequently is superior in dimension accuracy to the acrylic resins and the like. Therefore, due to containing polycarbonate as the principal component, the light guide film 1 is capable of inhibiting degradation over time. On the other hand, since the acrylic resins have a higher degree of transparency, a loss of rays of light in the light guide film 1 can be minimized.

LED

The plurality of LEDs 2 are provided along one end face of the light guide film 1. The plurality of LEDs 2 are provided such that light emitting faces face (or abut) the one end face of the light guide film 1.

Reflection Sheet

The reflection sheet 4 includes a resin layer containing a synthetic resin as a principal component. The reflection sheet 4 may be constituted either as a white resin layer in which a filler is contained in a dispersed state in a base resin such as polyester, or as a mirror sheet obtained by vapor deposition of a metal such as aluminum and silver on an upper face of a film formed from polyester or the like to thereby enhance specular reflectivity.

Function of Expanding Viewing Angle

With reference to FIG. 5, a function of expanding a viewing angle of the inverse prism sheet 3 and the backlight unit will be described hereinafter. First, with reference to FIG. 5 (*a*), viewing angle characteristics of an edge-lit backlight unit 121, in which an inverse prism sheet 124 does not have the large number of micro linear grooves 7, will be described. In the edge-lit backlight unit 121, comparatively directive rays of light are emitted from the LED 123; enter the light guide film 122 from an end face opposite to the LED 123; and then exit from an upper face of the light guide film 122. The rays of light having exited from the upper face of the light guide film 122 have a certain breadth and are inclined toward the emission direction of the LED 123. It is inferred that the rays of light having exited from the upper face of the light guide film 122 enter the inverse prism sheet 124, where the rays of light in a direction perpendicular to the orientation direction of the prism array 126 is condensed in the vertical direction, and consequently the rays of light exiting from the inverse prism sheet 124 have a small breadth in the direction perpendicular to the orientation direction of the prism array 126, resulting in the narrow viewing angle in the direction perpendicular to the orientation direction of the prism array 126.

In the backlight unit of the present embodiment, it is similarly inferred that the rays of light having exited from the upper face of the light guide film 1 are refracted by the prism array 6 where the breadth of the rays of light in the direction perpendicular to the orientation direction of the prism array 6 is condensed in the vertical direction. However, in the backlight unit of the present invention, the rays of light having been refracted by the prism array 6 and then reached the region where the large number of micro linear grooves 7 are formed are diffused in the width direction of the micro linear grooves 7, i.e., the direction perpendicular to the orientation direction of the prism array 6, as shown in FIG. 5(*b*). Thus, securing the sufficient viewing angle in the direction perpendicular to the orientation direction of the prism array 6 is enabled.

Advantages

In the backlight unit in which the LED 2 is employed as a light source, the inverse prism sheet 3 is capable of attaining the desired luminance in the front direction, and securing the sufficient viewing angle in the direction perpendicular to the orientation direction of the prism array 6.

In addition, due to the large number of micro linear grooves 7 being formed on the upper face of the substrate layer 5 serving as the uppermost face, the inverse prism sheet 3 enables effective diffusion of the rays of light refracted by the prism array 6 in the direction perpendicular to the orientation direction of the prism array 6 by virtue of a difference in refractive index between the substrate layer 5 and an air layer being present on an upper face side of the substrate layer 5, facilitating the sufficient expansion of the viewing angle in the direction perpendicular to the orientation direction of the prism array 6.

Due to the inverse prism sheet 3 in which the one end face of the light guide film 1 along which the plurality of LEDs 2 are arranged is positioned parallel to the prism array 6, the backlight unit for a liquid crystal display device is capable of attaining desired luminance in the front direction, and securing the sufficient viewing angle in the direction perpendicular to the orientation direction of the prism array, as described above.

Production Method of Inverse Prism Sheet

A production method of the inverse prism sheet 3 is exemplified by a method of forming the substrate layer 5 and the prism array 6 integrally, and a method of forming the substrate layer 5 and the prism array 6 separately.

Examples of the method of forming the substrate layer 5 and the prism array 6 integrally include:
(a) injection molding that involves injecting a melted resin into cavities of a die having a reversal shape of the prism array 6 and a die having a reversal shape of the large number of micro linear grooves 7;
(b) heat pressing that involves reheating, interposing between a pair of dies similar to those described above, and pressing a sheet-shaped resin to thereby transfer the shapes onto the sheet-shaped resin;
(c) extrusion sheet molding that involves feeding a melted resin to a nip between a roller die having the reversal shape of the prism array 6 on a periphery thereof and a roller die having the reversal shape of the large number of micro linear grooves 7 on a periphery thereof, to thereby transfer the shapes onto the resin;
and the like.

On the other hand, examples of the method of forming the substrate layer 5 and the prism array 6 separately include:
(d) a method that involves: forming the substrate layer 5 having the large number of micro linear grooves 7 formed on one face by the injection molding, the heat pressing, the extrusion sheet molding, etc.; applying an active energy ray-curable resin on the other face of the substrate layer 5; pressing a sheet die, a solid die, or a roller die having the reversal shape of the prism array 6 against the uncured active energy ray-curable resin to transfer the shape; and curing the active energy ray-curable resin by irradiating with an active energy ray;
(e) a method that involves: forming the substrate layer 5 having the large number of micro linear grooves 7 on one face; filling a solid die having the reversal shape of the prism array 6 with an uncured active energy ray-curable resin, or applying the uncured active energy ray-curable resin to a roller die having the reversal shape of the prism array 6; pressing the other face of the substrate layer 5 against the uncured active energy ray-curable resin to level; and curing the active energy ray-curable resin by irradiating with an active energy ray; and the like.

Advantages

The production method of an inverse prism sheet according to the present embodiment enables production of the inverse prism sheet 3 that is capable of attaining the desired luminance of the backlight unit in the front direction, and securing the sufficient viewing angle in the direction perpendicular to the orientation direction of the prism array 6, as described above.

Second Embodiment

Inverse Prism Sheet

An inverse prism sheet 13 of FIG. 6 is used for the edge-lit backlight unit 1 of FIG. 1, in place of the inverse prism sheet 3 of FIG. 1. The inverse prism sheet 13 of FIG. 6 is formed in a substantially rectangular shape in a planar view. The inverse prism sheet 13 includes a substrate layer 15 and a prism array 16 that is overlaid on the inferior face of the substrate layer 15. The inverse prism sheet 13 is constituted from the substrate layer 15 and the prism array 16 that is overlaid directly on the substrate layer 15 (in other words, the substrate layer 15 and the prism array 16 are integrally formed, without any other layer). The prism array 16 is a resin layer constituted from a plurality of protruding-streak prism portions 16*a* arranged in parallel, and disposed as an outermost layer of the inverse prism sheet 13. In addition, a large number of micro linear grooves 17 are formed on an interface between the adjacent resin layers (interface between the substrate layer 15 and the prism array 16) of the inverse prism sheet 13, so as to be parallel to, or to intersect at an acute angle with, an orientation direction of the prism array 16 in a planar view.

Substrate Layer

As shown in FIG. 6, the large number of micro linear grooves 17 are formed on an inferior face (a face in contact with the prism array 16) of the substrate layer 15. The large number of micro linear grooves 17 are formed as hair-line-like rows. The large number of micro linear grooves 17 may constitute the diffraction grating. A specific constitution of the large number of micro linear grooves 17 may be similar to that of the large number of micro linear grooves 7 in the inverse prism sheet 3 shown in FIG. 1. In other words, the inferior face of the substrate layer 15 of the inverse prism sheet 13 is formed similarly to the upper face of the substrate layer 5 of the inverse prism sheet 3 shown in FIG. 1.

Since the substrate layer 15 needs to transmit rays of light, the substrate layer 5 is formed from a transparent synthetic resin, in particular a colorless and transparent synthetic resin as a principal component. The principal component of the substrate layer 15 is not particularly limited, and exemplified by the synthetic resins exemplified in relation to the principal component of the substrate layer 5 of the inverse prism sheet 3 shown in FIG. 1. The average thickness of the substrate layer 15 may be similar to that of the substrate layer 5 of the inverse prism sheet 3 shown in FIG. 1.

The lower limit of a refractive index of the substrate layer 15 is preferably 1.51, more preferably 1.53, and still more preferably 1.55. Meanwhile, the upper limit of the refractive index of the substrate layer 15 is preferably 1.7, more preferably 1.67, and still more preferably 1.65. When the layers on both sides of the interface on which the large number of micro linear grooves 17 are formed have the greater difference in refractive index, the inverse prism sheet 13 is more likely to increase the amount of the rays of light diffused in the width direction of the large number of micro linear grooves 17. In this respect, when the refractive index of the substrate layer 15 is less than the lower limit, the difference in refractive index between the substrate layer 15 and the prism array 16, i.e., the layers on both sides of the interface, is not sufficient, leading to a failure to sufficiently increase the amount of the rays of light diffused in the width direction of the large number of micro linear grooves 17. To the contrary, when the refractive index of the substrate layer 15 is greater than the upper limit, there may be a restriction on resins that can be used for the substrate layer 15.

The lower limit of the difference in refractive index between the substrate layer 15 and the prism array 16 (i.e., the difference in refractive index between the layers on both sides of the interface on which the large number of micro linear grooves 17 are formed) is preferably 0.01, more preferably 0.05, and still more preferably 0.07. When the difference in refractive index is less than the lower limit, the sufficient increase of the amount of the rays of light diffused in the width direction of the large number of micro linear grooves 17 may not be enabled. Meanwhile, the upper limit of the difference in refractive index may be, for example, 0.15.

Prism Array

As described above, the prism array 16 is constituted from the plurality of protruding-streak prism portions 16a arranged in parallel. The protruding-streak prism portions 16a are in a substantially identical shape, and each have a triangular prism shape. A cross-sectional shape of each protruding-streak prism portion 16a is not particularly limited, but is preferably an isosceles-triangular shape, a base of which is a face on which the substrate layer 15 is overlaid. The pitch of the prism array 16, as well as the height, the vertex angle, and the base angle of each protruding-streak prism portion 16a may be similar to those in the case of the inverse prism sheet 3 shown in FIG. 1.

Since the prism array 16 needs to transmit rays of light, the prism array 6 is formed from a transparent synthetic resin, in particular a colorless and transparent synthetic resin as a principal component. The prism array 16 is formed from a synthetic resin different from that of the substrate layer 15. Specifically, the prism array 16 is formed from the active energy ray-curable resin as a principal component.

The lower limit of the refractive index of the prism array 16 is preferably 1.36, more preferably 1.4, and still more preferably 1.43. Meanwhile, the upper limit of the refractive index of the prism array 16 is preferably 1.51, more preferably 1.5, and still more preferably 1.49. When the refractive index of the prism array 16 is less than the lower limit, there may be a restriction on resins that can be used for the prism array 16. To the contrary, when the refractive index of the prism array 16 is greater than the upper limit, the difference in refractive index between the substrate layer 15 and the prism array 16, i.e., the layers on both sides of the interface, is not sufficient, leading to a failure to sufficiently increase the amount of the rays of light diffused in the width direction of the large number of micro linear grooves 17.

Advantages

Due to the large number of micro linear grooves 17 being formed on the interface between the adjacent resin layer (the substrate layer 15 and the prism array 16) so as to be parallel to, or to intersect at an acute angle with, an orientation direction of the prism array 16 in a planar view, the inverse prism sheet 13 is capable of attaining the desired luminance of the backlight unit in the front direction, and securing the sufficient viewing angle in the direction perpendicular to the orientation direction of the prism array 16. In addition, due to the large number of micro linear grooves 17 being formed on the interface between the substrate layer 15 and the prism array 16 so as to be parallel to, or to intersect at an acute angle with, the orientation direction of the prism array 16, the inverse prism sheet 13 enables diffusion of the rays of light refracted by the prism array 16 in the direction perpendicular to the orientation direction of the prism array 16, facilitating the sufficient expansion of the viewing angle in the direction perpendicular to the orientation direction of the prism array 16.

Production Method of Inverse Prism Sheet

The inverse prism sheet 13 is produced by a method of forming the substrate layer 15 and the prism array 16 separately. Examples of the production method of the inverse prism sheet 13 include:

(f) a method that involves: forming the substrate layer 15 having the large number of micro linear grooves 17 on one face by the injection molding, the heat pressing, the extrusion sheet molding, etc. similarly to the aforementioned production method of the inverse prism sheet 3; applying an active energy ray-curable resin on the one face of the substrate layer 15; pressing a sheet die, a solid die, or a roller die having the reversal shape of the prism array 16 against the uncured active energy ray-curable resin to transfer the shape; and curing the active energy ray-curable resin by irradiating with an active energy ray;

(g) a method that involves: forming the substrate layer 15 having the large number of micro linear grooves 17 on one face; filling a solid die having the reversal shape of the prism array 16 with an uncured active energy ray-curable resin, or applying the uncured active energy ray-curable resin to a roller die having the reversal shape of the prism array 16; pressing the one face of the substrate layer 15 against the uncured active energy ray-curable resin to level; and curing the active energy ray-curable resin by irradiating with an active energy ray;

and the like.

Advantages

The production method of an inverse prism sheet according to the present embodiment enables production of the inverse prism sheet 13 that is capable of attaining the desired luminance of the backlight unit in the front direction, and securing the sufficient viewing angle in the direction perpendicular to the orientation direction of the prism array 16, as described above.

Third Embodiment

Inverse Prism Sheet

Figure 7:
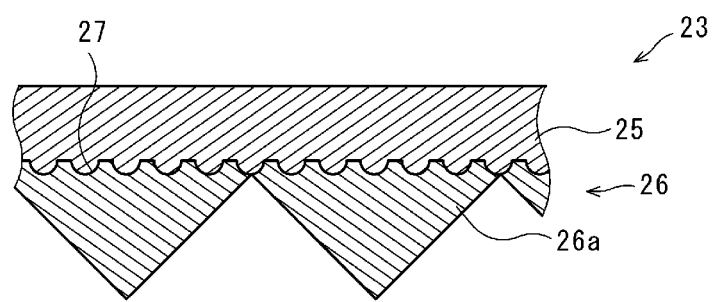
FIG. 7 is a schematic end view illustrating an inverse prism sheet according to an embodiment other than the inverse prism sheets shown in FIGS. 3 and 6.

An inverse prism sheet 23 of FIG. 7 is used for the edge-lit backlight unit 1 of FIG. 1, in place of the inverse prism sheet 3 of FIG. 1. The inverse prism sheet 23 of FIG. 7 is formed in a substantially rectangular shape in a planar view. The inverse prism sheet 23 includes a substrate layer 25 and a prism array 26 that is overlaid on the inferior face of the substrate layer 25. The inverse prism sheet 23 is constituted from the substrate layer 25 and the prism array 26 that is overlaid directly on the substrate layer 25 (in other words, the substrate layer 25 and the prism array 26 are integrally formed, without any other layer). The prism array 26 is a resin layer constituted from a plurality of protruding-streak prism portions 26*a* arranged in parallel, and disposed as an outermost layer of the inverse prism sheet 23. In addition, a large number of micro linear grooves 27 are formed on an interface between the adjacent resin layers (interface between the substrate layer 25 and the prism array 26) of the inverse prism sheet 23, so as to be parallel to, or to intersect at an acute angle with, an orientation direction of the prism array 26 in a planar view.

Substrate Layer

Since the substrate layer 25 needs to transmit rays of light, the substrate layer 25 is formed from a transparent synthetic resin, in particular a colorless and transparent synthetic resin as a principal component. The principal component of the substrate layer 25 is not particularly limited, and exemplified by the synthetic resins exemplified in relation to the principal component of the substrate layer 5 of the inverse prism sheet 3 shown in FIG. 1. The average thickness of the substrate layer 25 may be similar to that of the substrate layer 5 of the inverse prism sheet 3 shown in FIG. 1. The refractive index of the substrate layer 25 may be similar to that of the substrate layer 15 of the inverse prism sheet 13 shown in FIG. 6.

Prism Array

As described above, the prism array 26 is constituted from the plurality of protruding-streak prism portions 26*a* arranged in parallel. The protruding-streak prism portions 26*a* are in a substantially identical shape, and each have a triangular prism shape. A cross-sectional shape of each protruding-streak prism portion 26*a* is not particularly limited, but is preferably an isosceles-triangular shape, a base of which is a face on which the substrate layer 25 is overlaid. The pitch of the prism array 26, as well as the height, the vertex angle, and the base angle of each protruding-streak prism portion 26*a* may be similar to those in the case of the inverse prism sheet 3 shown in FIG. 1.

As shown in FIG. 7, the large number of micro linear grooves 27 are formed on an upper face (a face in contact with the substrate layer 25) of the prism array 26. The large number of micro linear grooves 27 are formed as hair-line-like rows. The large number of micro linear grooves 27 may constitute the diffraction grating. A specific constitution of the large number of micro linear grooves 27 may be similar to that of the large number of micro linear grooves 3 in the inverse prism sheet 3 shown in FIG. 1. In other words, the upper face of the prism array 26 of the inverse prism sheet 23 is formed similarly to the upper face of the substrate layer 5 of the inverse prism sheet 3 shown in FIG. 1.

Since the prism array 26 needs to transmit rays of light, the prism array 26 is formed from a transparent synthetic resin, in particular a colorless and transparent synthetic resin as a principal component. The prism array 26 is formed from a synthetic resin different from that of the substrate layer 25. Specifically, the prism array 26 is formed from the active energy ray-curable resin as a principal component.

The refractive index of the prism array 26 may be similar to that of the prism array 16 of the inverse prism sheet 13 shown in FIG. 6. In addition, the difference in refractive index between the substrate layer 25 and the prism array 26 (i.e., the difference in refractive index between the layers on both sides of the interface on which the large number of micro linear grooves 27 are formed) may be similar to the difference in refractive index between the substrate layer 15 and the prism array 16 of the inverse prism sheet 13 shown in FIG. 6.

Advantages

Due to the large number of micro linear grooves 27 being formed on the interface between the adjacent resin layer (the interface between the substrate layer 25 and the prism array 26) so as to be parallel to, or to intersect at an acute angle with, an orientation direction of the prism array 26 in a planar view, the inverse prism sheet 23 is capable of attaining the desired luminance of the backlight unit in the front direction, and securing the sufficient viewing angle in the direction perpendicular to the orientation direction of the prism array 26. In addition, due to the large number of micro linear grooves 27 being formed on the interface between the substrate layer 25 and the prism array 26 so as to be parallel to, or to intersect at an acute angle with, the orientation direction of the prism array 26, the inverse prism sheet 23 enables diffusion of the rays of light refracted by the prism array 26 in the direction perpendicular to the orientation direction of the prism array 26, facilitating the sufficient expansion of the viewing angle in the direction perpendicular to the orientation direction of the prism array 26.

Production Method of Inverse Prism Sheet

The inverse prism sheet 23 is produced by a method of forming the substrate layer 25 and the prism array 26 separately. Examples of the production method of the inverse prism sheet 23 include:

(h) a method that involves: forming the substrate layer 25 having the reversal shape of the large number of micro linear grooves 27 on one face by the injection molding, the heat pressing, the extrusion sheet molding, etc.; applying an active energy ray-curable resin on the one face of the substrate layer 25; pressing a sheet die, a solid die, or a roller die having the reversal shape of the prism array 26 against the uncured active energy ray-curable resin to transfer the shape; and curing the active energy ray-curable resin by irradiating with an active energy ray;

(i) a method that involves: forming the substrate layer 25 having the reversal shape of the large number of micro linear grooves 27 on one face; filling a solid die having the reversal shape of the prism array 26 with an uncured active energy ray-curable resin, or applying the uncured active energy ray-curable resin to a roller die having the reversal shape of the prism array 26; pressing the one face of the substrate layer 25 against the uncured active energy ray-curable resin to level; and curing the active energy ray-curable resin by irradiating with an active energy ray;

and the like.

Advantages

The production method of an inverse prism sheet according to the present embodiment enables production of the inverse prism sheet 23 that is capable of attaining the desired luminance of the backlight unit in the front direction, and securing the sufficient viewing angle in the direction perpendicular to the orientation direction of the prism array 26, as described above.

Fourth Embodiment

Inverse Prism Sheet

Figure 8:
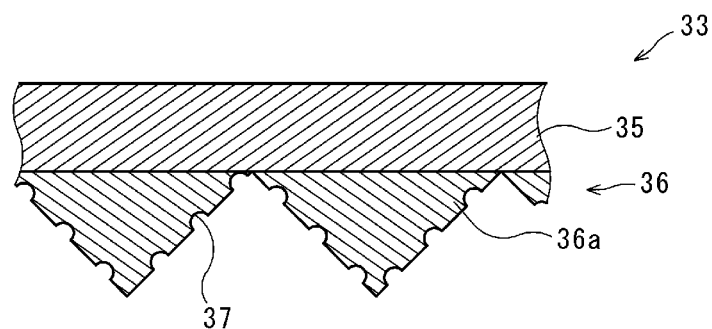
FIG. 8 is a schematic end view illustrating an inverse prism sheet according to an embodiment other than the inverse prism sheets shown in FIGS. 3, 6 and 7.

An inverse prism sheet 33 of FIG. 8 is used for the edge-lit backlight unit 1 of FIG. 1, in place of the inverse prism sheet 3 of FIG. 1. The inverse prism sheet 33 of FIG. 8 is formed in a substantially rectangular shape in a planar view. The inverse prism sheet 33 includes a substrate layer 35 and a prism array 36 that is overlaid on the inferior face of the substrate layer 35. The inverse prism sheet 33 is constituted from the substrate layer 35 and the prism array 36 that is overlaid directly on the substrate layer 35 (in other words, the substrate layer 35 and the prism array 36 are integrally formed, without any other layer). The prism array 36 is a resin layer constituted from a plurality of protruding-streak prism portions 36a arranged in parallel, and disposed as an outermost layer of the inverse prism sheet 33. In addition, a large number of micro linear grooves 37 are formed on a surface (the inferior face of the prism array 36) of the inverse prism sheet 33, so as to be parallel to, or to intersect at an acute angle with, an orientation direction of the prism array 36.

Substrate Layer

The substrate layer 35 is formed in a substantially cuboid shape with an upper face and an inferior face being planar. Since the substrate layer 35 needs to transmit rays of light, the substrate layer 35 is formed from a transparent synthetic resin, in particular a colorless and transparent synthetic resin as a principal component. The principal component of the substrate layer 35 is not particularly limited, and exemplified by the synthetic resins exemplified in relation to the principal component of the substrate layer 5 of the inverse prism sheet 3 shown in FIG. 1. The average thickness of the substrate layer 35 may be similar to that of the substrate layer 5 of the inverse prism sheet 3 shown in FIG. 1.

Prism Array

As described above, the prism array 36 is constituted from the plurality of protruding-streak prism portions 36a arranged in parallel. The protruding-streak prism portions 36a are in a substantially identical shape, and each have a triangular prism shape. A cross-sectional shape of each protruding-streak prism portion 36a is not particularly limited, but is preferably an isosceles-triangular shape, a base of which is a face on which the substrate layer 35 is overlaid. The pitch of the prism array 36, as well as the height, the vertex angle, and the base angle of each protruding-streak prism portion 36a may be similar to those in the case of the inverse prism sheet 3 shown in FIG. 1.

As shown in FIG. 8, the large number of micro linear grooves 37 are formed on the inferior face of the prism array 36. The large number of micro linear grooves 37 are formed as hair-line-like rows. The large number of micro linear grooves 37 may constitute the diffraction grating. A specific constitution of the large number of micro linear grooves 37 may be similar to that of the large number of micro linear grooves 3 in the inverse prism sheet 3 shown in FIG. 1.

Since the prism array 36 needs to transmit rays of light, the prism array 36 is formed from a transparent synthetic resin, in particular a colorless and transparent synthetic resin as a principal component. The principal component of the prism array 36 is exemplified by synthetic resins exemplified in relation to the principal component of the prism array 6 of the inverse prism sheet 3 shown in FIG. 1.

The lower limit of the refractive index of the prism array 36 is preferably 1.36, more preferably 1.4, and still more preferably 1.43. Meanwhile, the upper limit of the refractive index of the prism array 36 is preferably 1.7, more preferably 1.67, and still more preferably 1.65. When the refractive index of the prism array 36 falls within the above range, due to a difference in refractive index between the prism array 36 and an air layer being present on an inferior face side of the prism array 36, the amount of the rays of light diffused in the width direction of the large number of micro linear grooves 37 is sufficiently increased, facilitating the sufficient expansion of the viewing angle in a perpendicular direction of the prism array 36.

Advantages

Due to the large number of micro linear grooves 37 being formed on the surface so as to be parallel to, or to intersect at an acute angle with, an orientation direction of the prism array 36 in a planar view, the inverse prism sheet 33 is capable of attaining the desired luminance of the backlight unit in the front direction, and securing the sufficient viewing angle in the direction perpendicular to the orientation direction of the prism array 36.

Production Method of Inverse Prism Sheet

The inverse prism sheet 33 can be produced by methods similar to those described in relation to the inverse prism sheet 3 shown in FIG. 1, except that, for example, a solid die, a roller die or a sheet die having the reversal shape of the prism array 36 and the reversal shape of the large number of micro linear grooves 37 is used.

Advantages

The production method of an inverse prism sheet according to the present embodiment enables production of the inverse prism sheet 33 that is capable of attaining the desired luminance of the backlight unit in the front direction, and securing the sufficient viewing angle in the direction perpendicular to the orientation direction of the prism array 36, as described above.

Fifth Embodiment

Inverse Prism Sheet

An inverse prism sheet 43 of FIG. 9 is used for the edge-lit backlight unit 1 shown in FIG. 1, in place of the inverse prism sheet 3 shown in FIG. 1. The inverse prism sheet 43 shown in FIG. 9 is formed in a substantially rectangular shape in a planar view. The inverse prism sheet 43 includes a substrate layer 45 and a prism array 16 that is overlaid on the inferior face of the substrate layer 45. The inverse prism sheet 43 is constituted from the substrate layer 45 and the prism array 16 that is overlaid directly on the substrate layer 45 (in other words, the substrate layer 45 and the prism array 16 are integrally formed, without any other layer). The prism array 16 is identical to that of the inverse prism sheet 13 shown in FIG. 6, and therefore explanations thereof will be omitted through designating the identical number. In the inverse prism sheet 43, the large number of micro linear grooves 47 similar to those in the inverse prism sheet 3 shown in FIG. 1 are formed on the upper face of the substrate layer 45, and the large number of micro linear grooves 48 similar to those in the inverse prism sheet 23 shown in FIG. 7 are formed on the upper face of the prism array 46. The principal component of the substrate layer 45 is exemplified by the synthetic resins exemplified in relation to the principal component of the substrate layer 5 of the inverse prism sheet 3 shown in FIG. 1. The average thickness of the substrate layer 45 may be similar to that of the substrate layer 5 of the inverse prism sheet 3 shown in FIG. 1. The refractive index of the substrate layer 45, and the difference in refractive index between the substrate layer 45 and the prism array 46 may be similar to those of the inverse prism sheet 13 shown in FIG. 6.

Advantages

Due to the large number of micro linear grooves 47 and 48 being formed respectively on the substrate layer 45 and the prism array 16, the inverse prism sheet 43 is capable of attaining the desired luminance of the backlight unit in the front direction, and securing a further sufficient viewing angle in the direction perpendicular to the orientation direction of the prism array 46.

Production Method of Inverse Prism Sheet

The inverse prism sheet 43 is produced by a method of forming the substrate layer 45 and the prism array 16 separately. Examples of the production method of the inverse prism sheet 43 include:

(j) a method that involves: forming the substrate layer 45 having the reversal shape of the large number of micro linear grooves 48 on one face and the reversal shape of the large number of micro linear grooves 47 on the other face by the injection molding, the heat pressing, the extrusion sheet molding, etc.; applying an active energy ray-curable resin on the one face of the substrate layer 45; pressing a sheet die, a solid die, or a roller die having the reversal shape of the prism array 16 against the uncured active energy ray-curable resin to transfer the shape; and curing the active energy ray-curable resin by irradiating with an active energy ray;

(k) a method that involves: forming the substrate layer 45 having the reversal shape of the large number of micro linear grooves 48 on one face and the reversal shape of the large number of micro linear grooves 47 on the other face; filling a solid die having the reversal shape of the prism array 16 with an uncured active energy ray-curable resin, or applying the uncured active energy ray-curable resin to a roller die having the reversal shape of the prism array 16; pressing the one face of the substrate layer 45 against the uncured active energy ray-curable resin to level; and curing the active energy ray-curable resin by irradiating with an active energy ray;

and the like.

Advantages

The production method of an inverse prism sheet according to the present embodiment enables production of the inverse prism sheet 43 capable of attaining the desired luminance of the backlight unit in the front direction, and securing the sufficient viewing angle in the direction perpendicular to the orientation direction of the prism array 46, as described above.

Other Embodiments

It is to be noted that the prism sheet for a backlight unit and the backlight unit according to the embodiments of the present invention may be carried out in various modified or improved modes other than those described above. For example, although the prism sheet for a backlight unit is preferably an inverse prism sheet, the prism sheet for a backlight unit may also be a prism sheet disposed in such a way that the surface having the prism array is directed upward. Furthermore, although the prism sheet for a backlight unit preferably has a bilayered structure with the substrate layer and the prism array, the prism sheet for a backlight unit may also include other layers, and the large number of micro linear grooves may be formed on the surfaces of the other layers.

A region where the large number of micro linear grooves are formed is not limited as long as the region is on the surface of the prism sheet for a backlight unit, or on the interface of the adjacent resin layer. The large number of micro linear grooves may be also formed on a plurality of arbitrary surfaces or interfaces, such as: upper and inferior faces of the substrate layer; upper and inferior faces of the prism array; arbitrary faces of the substrate layer and the prism array; and the like. When the large number of micro linear grooves are formed on a plurality of faces, the inverse prism sheet enables a more effective expansion of the viewing angle of the liquid crystal display device in the direction perpendicular to the orientation direction of the prism array. The large number of micro linear grooves may be also formed in a partial region on the surface of the inverse prism sheet or the interface of the adjacent resin layer.

The specific shape of the large number of micro linear grooves is not limited to the shapes mentioned in the aforementioned embodiments, and may be, for example, a shape having a squared U-shape cross section as shown in FIG. 10, a shape having a triangular cross section as shown in FIG. 11, and a slit-like shape as shown in FIG. 12.

Although the backlight unit preferably has a plurality of LEDs, the backlight unit may also have only one LED. In the backlight unit, an optical waveguide sheet having a wedge shape in a side view may also be employed, for example, instead of the above described light guide film.

The backlight unit may further include other optical sheet(s) than the prism sheet for a backlight unit. Examples of the other optical sheet(s) include a light diffusion sheet, a prism sheet, a micro lens sheet, and the like. The backlight unit may further include another inverse prism sheet that is overlaid on the prism sheet for a backlight unit, such that the orientations of the prism arrays are perpendicular to one another. Furthermore, although the viewing angle of the liquid crystal display device in the direction perpendicular to the orientation direction of the prism array is enabled to be sufficiently secured by overlaying the prism sheet for the backlight unit directly on the upper face of the light guide film, other optical sheet(s) may be interposed between the light guide film and the prism sheet for a backlight unit.

The production methods described in the above embodiments enable easy formation of the large number of micro linear grooves as the hair-line-like rows; however, the large number of micro linear grooves may also be formed by methods other than the above-described production methods, e.g., laser processing, filing, and the like.

The backlight unit is preferably an edge-lit backlight unit, but may also be a direct-lit backlight unit. Furthermore, even when the edge-lit backlight unit is employed, the backlight unit is not required to be a unilateral edge-lit backlight unit in which at least one LED is arranged along only one end face of a light guide film, and may also be a bilateral edge-lit backlight unit in which a plurality of LEDs are arranged along opposite end faces of a light guide film, or an entire circumference edge-lit backlight unit in which a plurality of LEDs are arranged along each end face of a light guide film.

The backlight unit according to the embodiments of the present invention can be used for: comparatively large-sized visual display units such as a personal computer and a liquid crystal television; mobile phone terminals such as a smartphone; mobile terminals such as a tablet terminal; and the like.

EXAMPLES

Hereinafter, the embodiment of the present invention will be explained in detail by way of Examples; however, the present invention is not in any way limited to these Examples.

EXAMPLES

Nos. 1 to 3

Provided were the edge-lit backlight units shown in FIG. 1, each including: a light guide film that guides rays of light having entered from one end face toward an upper face side; a plurality of LEDs arranged along the one end face of the light guide film; and the prism sheet for a backlight unit (inverse prism sheet) according to the embodiments of the present invention disposed on the upper face side of the light guide film and provided with a prism array on an inferior face, in which the prism array is positioned parallel to the one end face; and a reflection sheet disposed on the inferior face side of the light guide film. As the inverse prism sheet, a prism sheet constituted of a substrate layer and a prism array overlaid on the inferior face of the substrate layer, having on the upper face of the substrate layer a large number of micro linear grooves that are parallel to an orientation direction of the prism array in a planar view was used. In the inverse prism sheet, the pitch of the prism array was 38 μm, and the vertex angle of the protruding-streak prism portion of the prism array was 65°. For each of the inverse prism sheets Nos. 1 to 3: the average thickness of the substrate layer; the difference in refractive index between the substrate layer and the prism array; the average width, average depth and average pitch of the micro linear grooves; and the arithmetic average roughness (Ra) of the upper face of the substrate layer with respect to the direction perpendicular to the orientation direction of the micro linear grooves, are shown in Table 1.

COMPARATIVE EXAMPLES

No. 4

Provided was an edge-lit backlight unit having a similar constitution to No. 1 except that a large number of micro linear groove were not formed on the upper face of the inverse prism sheet.

No. 5

Provided was an edge-lit backlight unit having a similar constitution to No. 1 except that the average width, average depth and average pitch of the micro linear grooves, and the arithmetic average roughness (Ra) of the upper face of the substrate layer with respect to the direction perpendicular to the orientation direction of the micro linear grooves were as shown in Table 1.

Diffusibility Evaluation

For each of the edge-lit backlight units Nos. 1 to 5, a viewing angle of rays of light emitted from the plurality of LEDs and exiting from the upper face of the inverse prism sheet was measured by using a viewing angle measurement device ("EzContrast" available from ELDIM). Specifically, with a perpendicular direction of the light emitting face (upper face) of the light guide film being defined as 90°; a planar direction of the light emitting face being defined as 0°; an arrangement direction of the plurality of LEDs (a horizontal direction parallel to the one end face of the light guide film) being defined as X axis; and a horizontal direction perpendicular to the X axis being defined as Y axis, half-value angles of X axis and Y axis for luminance at 90° were respectively measured. Furthermore, light diffusibility in the perpendicular direction of the upper face of the inverse prism sheet was evaluated by dividing the half-value angle of X axis by the half-value angle of Y axis. Table 2 shows the evaluation results.

TABLE 2

|  | Half-value angle of X axis/ Half-value angle of Y axis |
|---|---|
| No. 1 | 1.00 |
| No. 2 | 1.00 |
| No. 3 | 0.90 |
| No. 4 | 0.60 |
| No. 5 | 0.72 |

Evaluation Results

Table 2 demonstrates that the edge-lit backlight units Nos. 1 to 3 exhibited superior diffusibility in the upper face direction and were capable of securing the sufficient viewing angle, due to the average width, average depth and average pitch of the micro linear grooves, and the arithmetic average roughness (Ra) of the upper face of the substrate layer with respect to the direction perpendicular to the orientation direction of the micro linear grooves being appropriately controlled.

INDUSTRIAL APPLICABILITY

As explained in the foregoing, the prism sheet for a backlight unit and the backlight unit according to the embodiments of the present invention are capable of attaining the desired luminance in the front direction, and securing the sufficient viewing angle in the direction perpendicular to the orientation direction of the prism array, and are therefore suitably used for various liquid crystal display devices such as a high-quality transmissive liquid crystal display device.

TABLE 1

|  | Average thickness of substrate layer (μm) | Difference in refractive index between substrate layer and prism array | Micro linear grooves | | | Arithmetic average roughness (Ra) in direction perpendicular to orientation direction of micro linear grooves (μm) |
|---|---|---|---|---|---|---|
|  |  |  | Average width (μm) | Average depth (μm) | Average pitch (μm) |  |
| No. 1 | 75 | 0.09 | 32.7 | 28.1 | 31.5 | 4.30 |
| No. 2 | 75 | 0.09 | 9.3 | 2.8 | 9.3 | 1.34 |
| No. 3 | 75 | 0.09 | 26.9 | 6.44 | 26.9 | 0.92 |
| No. 4 | 75 | 0.09 | — | — | — | — |
| No. 5 | 75 | 0.09 | 1.0 | 0.5 | 28.82 | 0.30 |

EXPLANATION OF THE REFERENCE SYMBOLS

1 Light guide film
2 LED
3, 13, 23, 33, 43 Inverse prism sheet
4 Reflection sheet 5, 15, 25, 35, 45 Substrate layer
6, 16, 26, 36 Prism array
6a, 16a, 26a, 36a Protruding-streak prism portion
7, 17, 27, 37, 47, 48 Micro linear groove
8 Recessed part
9 Raised part
101, 121 Edge-lit backlight unit
102 Optical waveguide sheet
103 LED
104 Inverse prism sheet
122 Light guide film
123 LED
124 Inverse prism sheet
126 Prism array

What is claimed is:

1. A prism sheet for a backlight unit, the prism sheet comprising one or more resin layers,
   an outermost resin layer of the one or more resin layers comprising a prism array, wherein
   on a surface of at least one of the one or more resin layers, a large number of micro linear grooves are formed to be parallel to, or to intersect at an acute angle with, an orientation direction of the prism array,
   a ratio of an average pitch of the large number of micro linear grooves to a pitch of the prism array is no less than 0.1 and no greater than 0.6 and
   the large number of micro linear grooves are configured to transmit and diffuse incident rays of light in a width direction of the large number of micro linear grooves, a width of each of the large number of micro linear grooves varying randomly along a longitudinal direction of the large number of micro linear grooves.

2. The prism sheet for a backlight unit according to claim 1, wherein an average number of existing micro linear grooves per unit length in a direction perpendicular to an average orientation direction of the large number of micro linear grooves is no less than 30/mm and no greater than 10,000/mm.

3. The prism sheet for a backlight unit according to claim 1, wherein the large number of micro linear grooves are irregular in length, width, or pitch.

4. The prism sheet for a backlight unit according to claim 1, wherein an arithmetic average roughness (Ra) of the surface on which the large number of micro linear grooves are formed with respect to the direction perpendicular to the average orientation direction of the large number of micro linear grooves is no less than 0.5 µm and no greater than 10 µm.

5. The prism sheet for a backlight unit according to claim 1, wherein:
   the large number of micro linear grooves are formed on an interface of an adjacent resin layer; and
   a difference in refractive index between layers on both sides of the interface is no less than 0.01.

6. The prism sheet for a backlight unit according to claim 1, wherein the large number of micro linear grooves constitute a diffraction grating.

7. A backlight unit for a liquid crystal display device, comprising:
   a light guide film that guides rays of light having entered from one end face toward an upper face side;
   at least one LED that is arranged along the one end face of the light guide film; and
   a prism sheet that is disposed on the upper face side of the light guide film, with a face having a prism array being directed downward,
   wherein the prism sheet for a backlight unit according to claim 1 is used as the prism sheet, and
   the one end face along which the LED is arranged is positioned parallel to the prism array of the prism sheet.

* * * * *